(12) United States Patent
Sorahana

(10) Patent No.: US 12,058,305 B2
(45) Date of Patent: Aug. 6, 2024

(54) IMAGE DISPLAY APPARATUS AND DISPLAY APPARATUS

(71) Applicant: SONY GROUP CORPORATION, Tokyo (JP)

(72) Inventor: Toshiaki Sorahana, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/255,103

(22) PCT Filed: Oct. 20, 2021

(86) PCT No.: PCT/JP2021/038682
§ 371 (c)(1),
(2) Date: May 31, 2023

(87) PCT Pub. No.: WO2022/123918
PCT Pub. Date: Jun. 16, 2022

(65) Prior Publication Data
US 2024/0106999 A1    Mar. 28, 2024

(30) Foreign Application Priority Data
Dec. 8, 2020  (JP) .................................. 2020-203283

(51) Int. Cl.
*G09G 5/00* (2006.01)
*G02B 27/14* (2006.01)
(Continued)

(52) U.S. Cl.
CPC ......... *H04N 13/344* (2018.05); *G02B 27/145* (2013.01); *G02B 27/30* (2013.01); *G02F 1/133638* (2021.01); *H04N 13/346* (2018.05)

(58) Field of Classification Search
CPC . G06F 9/00; G06F 9/4843; G06F 8/20; G06F 8/38; G06F 9/4411; G06F 9/455;
(Continued)

(56) References Cited

U.S. PATENT DOCUMENTS

| 5,863,125 A | 1/1999 | Doany |
| 2004/0070736 A1 | 4/2004 | Roddy |

(Continued)

FOREIGN PATENT DOCUMENTS

| AU | 2016258618 A1 | 10/2017 |
| CN | 110312113 A | 10/2019 |

(Continued)

OTHER PUBLICATIONS

International Search Report and Written Opinion of PCT Application No. PCT/JP2021/038682, issued on Jan. 11, 2022, 08 pages of ISRWO.

(Continued)

*Primary Examiner* — Insa Sadio
(74) *Attorney, Agent, or Firm* — CHIP LAW GROUP

(57) ABSTRACT

To provide an image display apparatus and a display apparatus including the image display apparatus which are capable of achieving further simplification of an apparatus configuration, achieving further speed-up of generation of a super multi-view, achieving further suppression of an apparatus manufacturing cost, and achieving further suppression of an adjustment cost of an optical axis. Provided is an image display apparatus including a light source, at least two image forming apparatuses, a quarter-wave plate, a beam splitter, a lens, and an eyepiece for each of eyes of a user. Out of the at least two image forming apparatuses, a first image forming apparatus is provided in a predetermined angular direction with respect to an optical axis of the lens, and a second image forming apparatus is provided in a direction substan- (Continued)

tially perpendicular to the optical axis of the lens. Light emitted from the light source is incident on the first image forming apparatus and the second image forming apparatus via the lens, the beam splitter, and the quarter-wave plate in this order. First image light emitted from the first image forming apparatus and second image light emitted from the second image forming apparatus are incident on each of the eyes of the user via the quarter-wave plate, the beam splitter, and the eyepiece in this order.

18 Claims, 10 Drawing Sheets

(51) Int. Cl.
G02B 27/30 (2006.01)
G02F 1/13363 (2006.01)
H04N 13/344 (2018.01)
H04N 13/346 (2018.01)

(58) Field of Classification Search
CPC .......... G06N 3/047; G06N 7/01; G06N 3/044; G09G 2370/022; G09G 5/006; H04L 41/083; H04L 41/0886; H04L 67/10; H04L 67/131; H04L 67/60; A63F 13/55; A63F 13/57; A63F 13/67; A63F 2300/6027; A63F 2300/8082
See application file for complete search history.

(56) References Cited

U.S. PATENT DOCUMENTS

| | | | | |
|---|---|---|---|---|
| 2013/0328762 | A1* | 12/2013 | McCulloch | G06F 3/016 345/156 |
| 2016/0293133 | A1* | 10/2016 | Dutt | G06N 3/047 |
| 2017/0299869 | A1 | 10/2017 | Urey et al. | |

FOREIGN PATENT DOCUMENTS

| | | |
|---|---|---|
| JP | 11-174368 A | 7/1999 |
| JP | 2001-215441 A | 8/2001 |
| JP | 2009-020251 A | 1/2009 |
| JP | 2011-133508 A | 7/2011 |
| JP | 2013-205749 A | 10/2013 |
| KR | 20050012513 A | 2/2005 |

OTHER PUBLICATIONS

Anonymous: "Liquid crystal tunable filter", Jun. 19, 2020 (Jun. 19, 2020), XP093147545, pp. 1-4, Retrieved from the Internet: URL:https://web.archive.org/web/20200619141941/https://en.wikipedia.org/wiki/Liquid_crystal_tunable_filter [retrieved on Apr. 3, 2024].

* cited by examiner

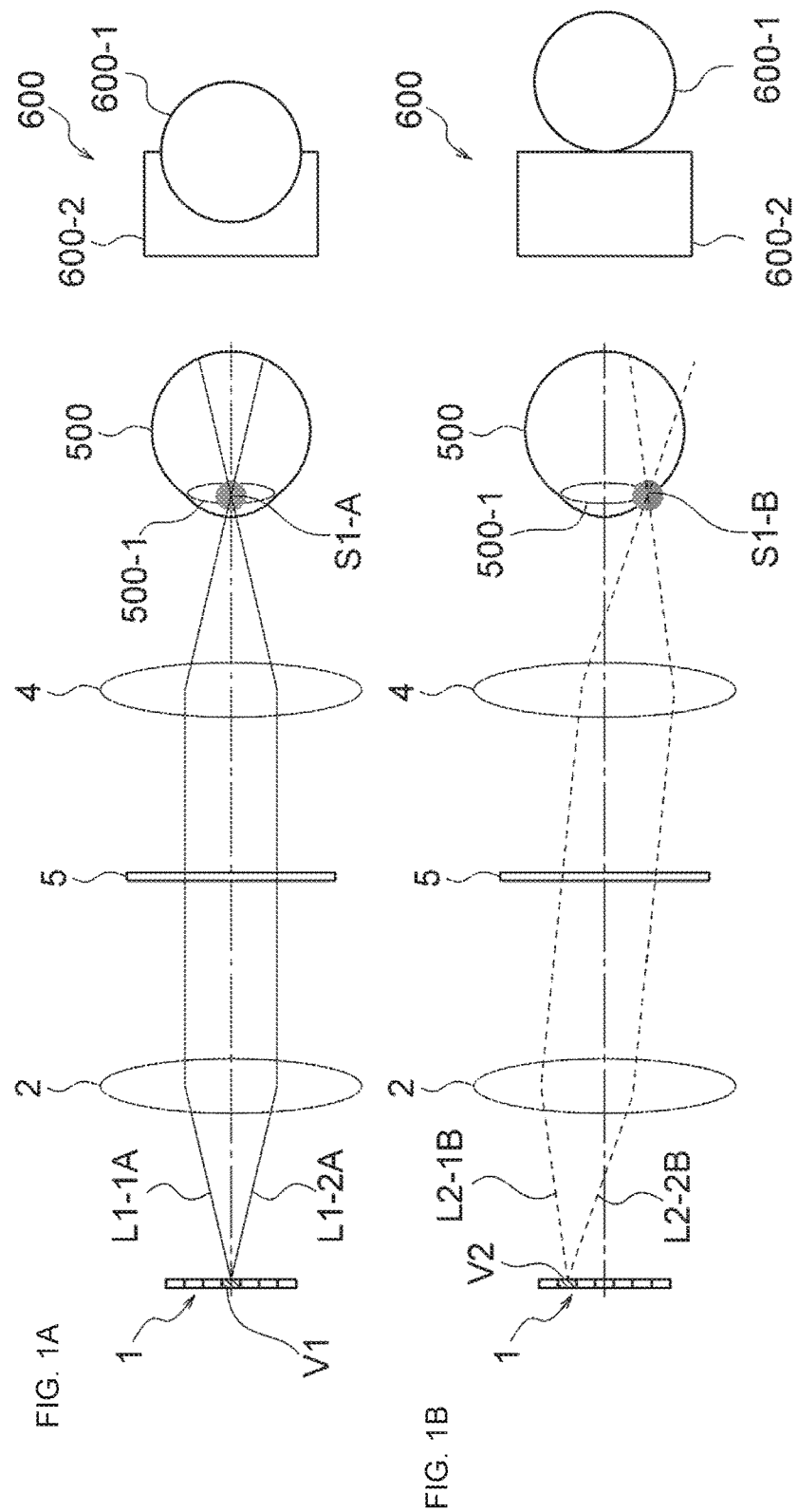

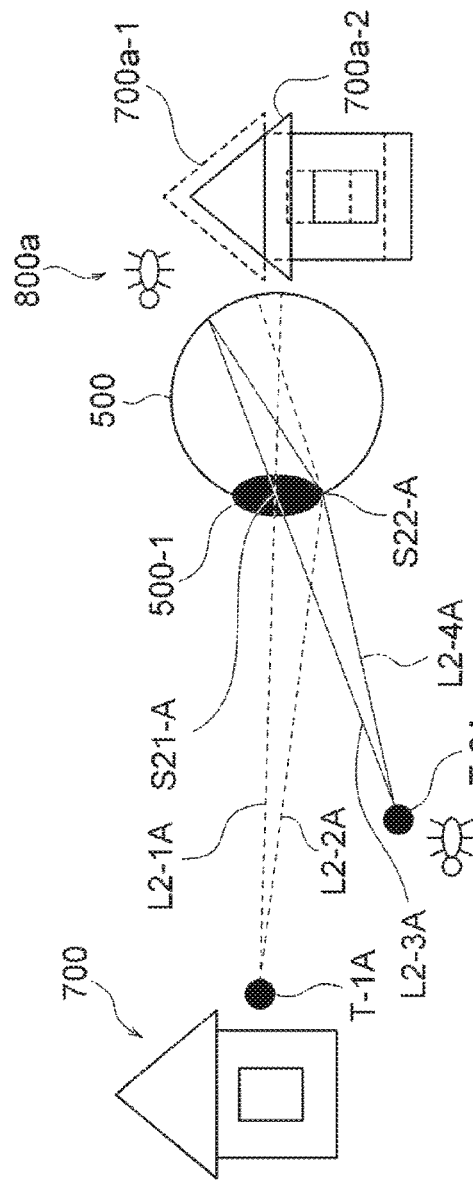
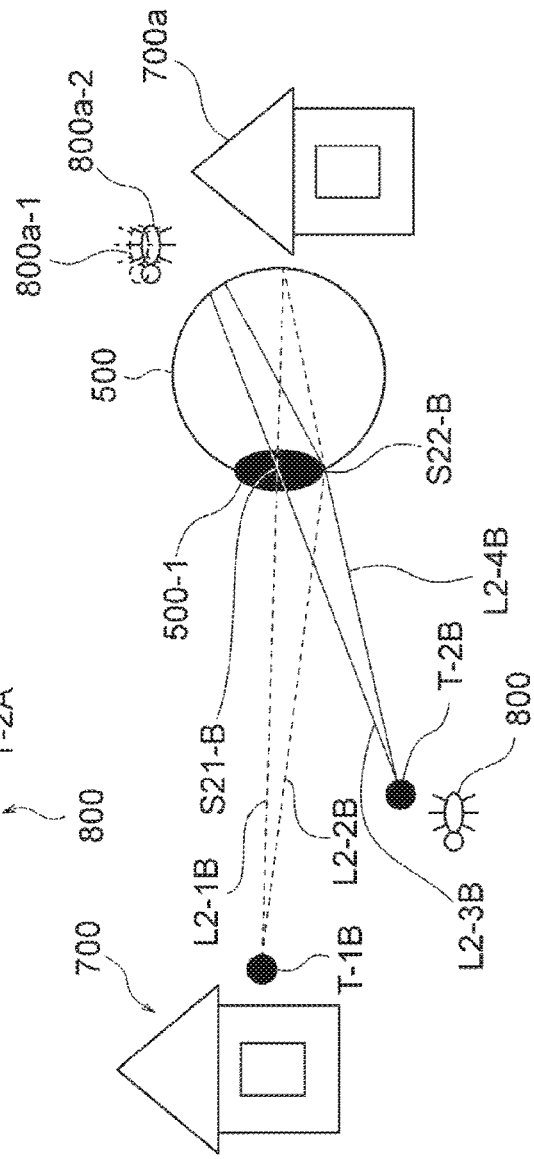
FIG. 2A
FIG. 2B

IMAGE DISPLAY APPARATUS AND DISPLAY APPARATUS

CROSS REFERENCE TO RELATED APPLICATIONS

This application is a U.S. National Phase of International Patent Application No. PCT/JP2021/038682 filed on Oct. 20, 2021, which claims priority benefit of Japanese Patent Application No. JP 2020-203283 filed in the Japan Patent Office on Dec. 8, 2020. Each of the above-referenced applications is hereby incorporated herein by reference in its entirety.

TECHNICAL FIELD

The present technology relates to an image display apparatus and a display apparatus.

BACKGROUND ART

In recent years, attention has been paid on a technology (augmented reality (AR) technology) in which an image (video) is superimposed and displayed on an external scene, such as a real landscape, in front of user's eyes, and a technology (virtual reality (VR) technology) in which a reality, which is different from a reality in front of user's eyes, is displayed as an image (video). One of products using these technologies is, for example, a head-mounted display (HMD) that displays a three-dimensional image (three-dimensional video). The head-mounted display is used by being mounted on a head of a user.

For example, Patent Document 1 proposes a technology related to a stereoscopic display apparatus that optimally displays a stereoscopic image at an intended presentation distance with a simple and inexpensive configuration.

Furthermore, for example, Patent Document 2 proposes a technology related to an image observation apparatus that enables an observer to observe a stereoscopic image in a natural state without being tired by utilizing stereoscopic display of a super-multi-view region.

CITATION LIST

Patent Document

Patent Document 1: Japanese Patent Application Laid-Open No. 2011-133508
Patent Document 2: Japanese Patent Application Laid-Open No. 2001-215441

SUMMARY OF THE INVENTION

Problems to be Solved by the Invention

In the technologies proposed in Patent Documents 1 and 2, however, it may be difficult to further simplify an apparatus configuration, further speed up generation of a super multi-view, further suppress an apparatus manufacturing cost, and further suppress an adjustment cost of an optical axis.

Therefore, the present technology has been made in view of such a situation, and a main object thereof is to provide an image display apparatus and a display apparatus including the image display apparatus which are capable of achieving further simplification of an apparatus configuration, achieving further speed-up of generation of a super multi-view, achieving further suppression of an apparatus manufacturing cost, and achieving further suppression of an adjustment cost of an optical axis.

Solutions to Problems

As a result of intensive research to obtain the above-described object, the present inventors have surprisingly succeeded in achieving further simplification of the apparatus configuration, achieving further speed-up of the generation of the super multi-view, achieving further suppression of the apparatus manufacturing cost, and achieving further suppression of the adjustment cost of the optical axis, thereby completing the present technology.

That is, as a first aspect, the present technology provides an image display apparatus including a light source, at least two image forming apparatuses, a quarter-wave plate, a beam splitter, a lens, and an eyepiece for each of eyes of a user. Out of the at least two image forming apparatuses, a first image forming apparatus is provided in a predetermined angular direction with respect to an optical axis of the lens, and a second image forming apparatus is provided in a direction substantially perpendicular to the optical axis of the lens. Light emitted from the light source is incident on the first image forming apparatus and the second image forming apparatus via the lens, the beam splitter, and the quarter-wave plate in this order. First image light emitted from the first image forming apparatus and second image light emitted from the second image forming apparatus are incident on each of the eyes of the user via the quarter-wave plate, the beam splitter, and the eyepiece in this order.

In the image display apparatus according to the first aspect of the present technology, the beam splitter may be a half mirror.

In the image display apparatus according to the first aspect of the present technology, the light source may be a point light source array, and a wavelength variable filter may be disposed between the point light source array and the lens.

In the image display apparatus according to the first aspect of the present technology, the light source may be a point light source array, and a filter wheel may be disposed between the point light source array and the lens.

In the image display apparatus according to the first aspect of the present technology, the light source may be a point light source array, and a liquid crystal tunable filter may be disposed between the point light source array and the lens.

In the image display apparatus according to the first aspect of the present technology, the light source may be a polychromatic point light source array.

In the image display apparatus according to the first aspect of the present technology, the lens may be a collimator lens.

In the image display apparatus according to the first aspect of the present technology, each of the first image forming apparatus and the second image forming apparatus may include a spatial light modulator.

In the image display apparatus according to the first aspect of the present technology, the spatial light modulator may be a reflection type.

In the image display apparatus according to the first aspect of the present technology, each of the first image forming apparatus and the second image forming apparatus may include a liquid crystal on silicon (LCOS) device.

In the image display apparatus according to the first aspect of the present technology, each of the first image forming apparatus and the second image forming apparatus may include a ferroelectric liquid crystal on silicon (FL-COS) device.

In the image display apparatus according to the first aspect of the present technology, each of the first image forming apparatus and the second image forming apparatus may include a digital mirror device.

Furthermore, as a second aspect, the present technology provides an image display apparatus including a light source, at least two image forming apparatuses, at least two beam splitters, at least two mirrors, a lens, and an eyepiece for each of eyes of a user. Out of the at least two image forming apparatuses, a first image forming apparatus is provided in a direction substantially parallel to an optical axis of the lens, and a second image forming apparatus is provided in a direction substantially perpendicular to the optical axis of the lens. Light emitted from the light source is incident on the first image forming apparatus and the second image forming apparatus via the lens and a first beam splitter out of the at least two beam splitters in this order. First image light emitted from the first image forming apparatus is incident on each of the eyes of the user via a first mirror and a second mirror of the at least two mirrors, a second beam splitter out of the at least two beam splitters, and the eyepiece in this order, and second image light emitted from the second image forming apparatus is incident on each of the eyes of the user via the second beam splitter out of the at least two beam splitters and the eyepiece in this order.

In the image display apparatus according to the second aspect of the present technology, each of the first image forming apparatus and the second image forming apparatus may include a spatial light modulator.

In the image display apparatus according to the second aspect of the present technology, the spatial light modulator may be a transmission type.

In the image display apparatus according to the second aspect of the present technology, each of the first mirror and the second mirror may be provided in a predetermined angular direction with respect to the optical axis of the lens.

Moreover, as a third aspect, the present technology provides a display apparatus including a frame mounted on a head of a user and an image display apparatus attached to the frame, the image display apparatus being the image display apparatus of the first aspect according to the present technology or the image display apparatus of the second aspect according to the present technology.

According to the present technology, it is possible to achieve further simplification of the apparatus configuration, further speed-up of the generation of the super multi-view, further suppression of the apparatus manufacturing cost, and further suppression of the adjustment cost of the optical axis. Note that the effects described herein are not necessarily limited, and may be any of effects described in the present disclosure.

BRIEF DESCRIPTION OF DRAWINGS

FIGS. 1A and 1B are diagrams for describing a principle of a time-division type super multi-view display (SMVD: image display apparatus).

FIGS. 2A and 2B are diagrams for describing a principle in which focusing is activated by a super multi-view.

MODE FOR CARRYING OUT THE INVENTION

Figure 3:
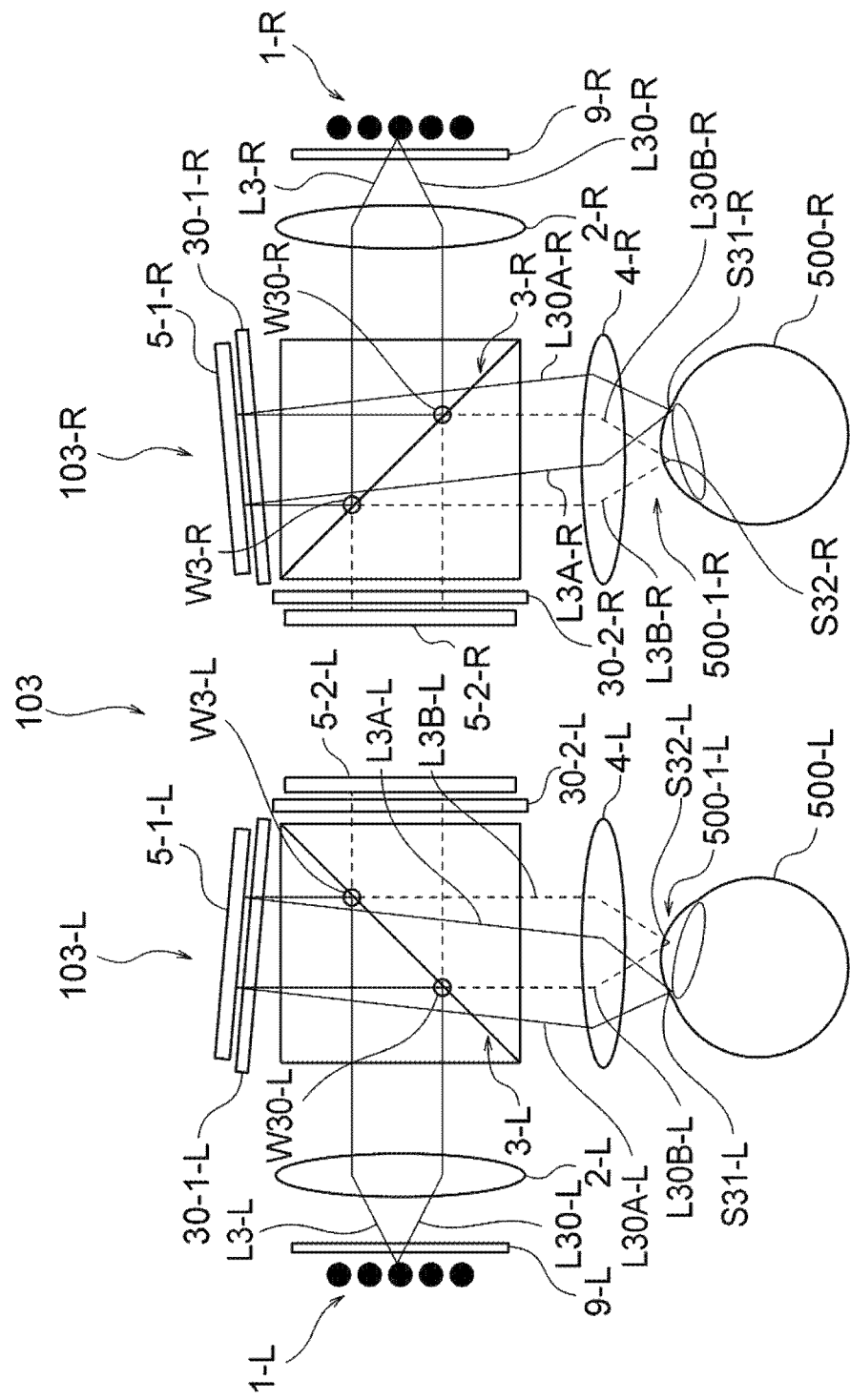
FIG. 3 is a diagram illustrating a configuration example of an image display apparatus according to a first embodiment to which the present technology is applied.

Hereinafter, preferred modes for carrying out the present technology will be described. Embodiments to be described hereinafter illustrate examples of representative embodiments of the present technology, and the scope of the present technology is not narrowly construed by the embodiments. Note that, in the drawings, "upper" means an upper direction or an upper side in the drawings, "lower" means a lower direction or a lower side in the drawings, "left" means a left direction or a left side in the drawings, and "right" means a right direction or a right side in the drawings unless otherwise specified. Furthermore, in the description using the drawings, the same or equivalent elements or members are denoted by the same reference signs, and the redundant description is omitted.

Note that a description will be given in the following order.

1. Overview of Present Technology
2. First Embodiment (Example 1 of Image Display Apparatus)
3. Second Embodiment (Example 2 of Image Display Apparatus)
4. Third Embodiment (Example 3 of Image Display Apparatus)
5. Fourth Embodiment (Example 4 of Image Display Apparatus)
6. Fifth Embodiment (Example 5 of Image Display Apparatus)
7. Sixth Embodiment (Example 6 of Image Display Apparatus)
8. Seventh Embodiment (Example 7 of Image Display Apparatus)
9. Eighth Embodiment (Example 1 of Display Apparatus)

1. Overview of Present Technology

First, an overview of the present technology will be described.

The present technology relates to an image display apparatus that presents a three-dimensional video and a display apparatus (examples thereof include a head-mounted display (HMD)) including the image display apparatus.

There is a case where the head-mounted display (HMD) employs a structure that presents binocular parallax and does not induce focusing as depth perception. In this case, a vergence accommodation conflict (VAC) may occur. The VAC is a phenomenon in which a vergence angle reacts to an image presented according to the binocular parallax, and focusing is fixed on a video display surface, which becomes a factor causing physiological discomfort such as 3D motion sickness, VR motion sickness, eye strain, and headache, user age restriction, and the like.

For example, as the HMD that solves the VAC, a method of reproducing an optical wavefront like holography or a method of reproducing a position and an angle of a ray like a light field can be cited as Technical Example 1, Technical Example 2, and Technical Example 3. However, in the method as in Technical Example 1, it is necessary to use resources of an apparatus for reproducing angle information in order to add depth information, which may lead to degradation in the resolution and a viewing angle. In Technical Example 2 and Technical Example 3, optimization calculation is required to add depth information, so that a calculation cost and a rendering cost may increase.

One of methods of reproducing excellent depth information with high resolution at a low calculation cost is a time-division type super multi-view display (SMVD). The time-division type SMVD generates a high-density viewpoint in a time-division manner and reproduces depth information, but it is necessary to move the viewpoint and switch a viewpoint video at a high speed.

For example, Technical Example 4 can be cited. Technical Example 4 is a technology of a method of creating a super multi-view in a time-division manner using a galvanometer mirror. In Technical Example 4, the super multi-view lens can be created by varying viewpoints of a video displayed on a display in synchronization with operations of the galvanometer mirror. However, in Technical Example 4, the viewpoints can be generated only in a one-dimensional direction, and thus, there is a possibility that it is difficult to reproduce the viewpoints sufficient for activating focusing. Furthermore, only one display is used, and thus, a speed of generating the viewpoints may be insufficient, and colorization or the like may be difficult. Moreover, a drive mechanism for operating the galvanometer mirror is required, which may complicate a structure and increase a size.

Furthermore, for example, as Technical Example 5, there is a technology in which a plurality of point light source arrays and spatial light modulators are provided, and viewpoints are coupled by a half mirror. In Technical Example 5, it is possible to simultaneously generate multiple viewpoints using the plurality of point light source arrays and a set of the spatial light modulators, but there is a possibility that a structure becomes complicated and a size increases. Furthermore, it is necessary to adjust a plurality of optical axes so that there is a possibility that manufacture and adjustment become difficult.

The present technology has been made in view of the circumstance described above. The present technology includes an optical circuit, for example, using a light source (for example, a point light source array), at least an image forming apparatus (for example, at least two spatial light modulators, a beam splitter (for example, a half mirror), a lens (for example, a collimator lens), and an eyepiece. In this optical circuit, a wavelength variable filter or the like may be disposed between the light source (for example, the point light source array) and the lens (for example, the collimator lens), and then, this configuration is prepared for both the eyes.

The image display apparatus (display apparatus) according to the present technology includes a super multi-view display (SMVD) having depth information. In the present technology, an image forming apparatus (examples thereof include the spatial light modulator, a liquid crystal on silicon (LCOS) device, a ferroelectric liquid crystal on silicon (FLCOS) device, and a digital mirror device) installed substantially perpendicular to an optical axis of the lens (for example, the collimator lens) and an image forming apparatus (for example, the spatial light modulator) installed to be inclined with respect to the optical axis of the lens (for example, the collimator lens) can reproduce images (videos) of two mutually different viewpoints and simultaneously generate the two mutually different viewpoints by being coupled through the optical circuit. The point light source that emits light changes with time, and it is possible to create a super multi-view in a time-division manner by synchronizing with a viewpoint image reflected on the spatial light modulator. The light source used in the image display apparatus (display apparatus) according to the present technology may be, for example, an LED, a laser, or a vertical cavity surface emitting laser (VCSEL).

In the present technology, the two mutually different viewpoints can be simultaneously generated using at least the two image forming apparatuses (for example, at least the two spatial light modulators), and the super multi-view can be generated at a high speed. According to the present technology, it is possible to achieve higher depth reproducibility, wider eye-box, colorization, and the like by configuring the super multi-view at the high speed. Furthermore, according to the present technology, the two viewpoints can be simultaneously generated with a simple structure since at least one image forming apparatus (for example, the spatial light modulator) is inclined with respect to the optical axis of the lens (for example, the collimator lens), and a manufacturing cost of the image display apparatus (display apparatus) and an adjustment cost of the optical axis can be suppressed.

Hereinafter, preferred modes for carrying out the present technology will be described in detail with reference to the drawings. Embodiments to be described hereinafter illustrate examples of representative embodiments of the present technology, and the scope of the present technology is not narrowly construed by the embodiments.

2. First Embodiment (Example 1 of Image Display Apparatus)

An image display apparatus of a first embodiment (Example 1 of the image display apparatus) according to the present technology includes a light source, at least two image forming apparatuses, a quarter-wave plate, a beam splitter, a lens, and an eyepiece for each of eyes of a user. In the image display apparatus of the first embodiment according to the present technology, out of the at least two image forming apparatuses, a first image forming apparatus is provided in a predetermined angular direction with respect to an optical axis of the lens, and a second image forming apparatus is provided in a direction substantially perpendicular to the optical axis of the lens. Furthermore, in the image display apparatus of the first embodiment according to the present technology, light emitted from the light source is incident on the first image forming apparatus and the second image forming apparatus via the lens, the beam splitter, and the quarter-wave plate in this order, and first image light emitted from the first image forming apparatus and second image light emitted from the second image forming apparatus are incident on each of the eyes of the user via the quarter-wave plate, the beam splitter, and the eyepiece in this order.

Moreover, in the image display apparatus of the first embodiment according to the present technology, each of the first image forming apparatus and the second image forming apparatus includes a reflective spatial light modulator, the light source is a point light source array, and a wavelength variable filter is disposed between the point light source array and the lens.

With respect to the optical axis of the lens, the first image forming apparatus is provided in the predetermined angular direction as described above, and may be provided for example, at any angle of more than 0 degrees to less than 90 degrees.

Examples of the beam splitter include a half mirror and the like. Examples of the lens include a collimator lens.

The image display apparatus of the first embodiment according to the present technology suppresses calculation and mounting costs by using a time-division type SMVD and has high resolution and high depth reproducibility, which is different from methods of reproducing a depth such as holography and a light field. Note that, similarly, each of image display apparatuses of second to seventh embodiments according to the present technology as described later also suppresses calculation and mounting costs by using a time-division type SMVD and has high resolution and high depth reproducibility.

Hereinafter, the image display apparatus of the first embodiment (Example 1 of the image display apparatus) according to the present technology will be described with reference to FIGS. 1A, 1B, 2A, 2B, 3, and 4.

First, a description will be made with reference to FIGS. 1A, 1B, 2A, and 2B. FIGS. 1A and 1B are diagrams for describing a principle of a time-division type super multi-view display (SMVD: image display apparatus). FIGS. 2A and 2B are diagrams for describing a principle in which focusing is activated by a super multi-view.

As illustrated in FIG. 1A, at a time t, one point (point V1) of a point light source array 1 is lit, and light L1-1A and light L1-2A are made parallel light by a collimator lens 2 and made incident on a spatial light modulator 5, and then, the spatial light modulator 5 emits image light, the image light is collected by an eyepiece 4, and a viewpoint S1-A based on the light L1-1A and the light L1-2A is generated in a pupil 500-1 of an eye (eyeball) 500, whereby a video of point S1-A is reflected on a human retina (an object 600 is reflected in a state in which a circular object 600-1 and a rectangular object 600-2 constituting the object 600 overlap with each other)

Next, as illustrated in FIG. 1B, at a time t', one point (point V2) of the point light source array 1 is lit, and light L2-1B and the light L2-2B are made parallel light by the collimator lens 2 and made incident on the spatial light modulator 5, and then, the spatial light modulator 5 emits image light, and the image light is collected by the eyepiece 4, and a viewpoint S1-B based on the light L2-1B and the light L2-2B is generated in the pupil 500-1 of the eye (eyeball) 500, whereby a video of point S1-B is reflected on a human retina (the object 600 is reflected in a state in which the circular object 600-1 and the rectangular object 600-2 constituting the object 600 do not overlap)

When a difference between t and t' is reduced to such an extent as to be perceived to be simultaneous by humans, rays of an object in focus of two viewpoints are converged on the retina, as illustrated in FIGS. 2A and 2B. On the other hand, rays of an object out of focus are not converged on the retina.

This will be described more specifically with reference to FIGS. 2A and 2B. In FIG. 2A, an ant 800 (point T-2A) is focused and a house 700 (point T-1A) is not focused. Light L2-3A from the ant 800 (point T-2A) and light L2-1A from the house 700 (point T-1A) generate a viewpoint S21-A at the pupil 500-1 of the eye 500, and light L2-4A from the ant 800 (point T-2A) and light L2-2A from the house 700 (point T-1A) generate a viewpoint S22-A at the pupil 500-1 of the eye 500 (that is, two viewpoints are generated in total). Then, the light L2-3A and the light L2-4A from the ant 800 (point T-2A) are converged on the retina of the eye 500 with the two viewpoints (the viewpoint S21-A and the viewpoint S22-A) being in focus, and are seen as an ant 800a, so that there is no blur. On the other hand, the light L2-1A and the light L2-2A from the house 700 (point T-1A) are not converged on the retina of the eye 500 with the two viewpoints (the viewpoint S21-A and the viewpoint S22-A) being out of focus, and are seen as houses 700a-1 and 700a-2, so that there is a blur.

On the other hand, in FIG. 2B, the ant 800 (point T-2B) is not focused, but the house 700 (point T-1B) is focused. Light L2-3B from the ant 800 (point T-2B) and light L2-1B from the house 700 (point T-1B) generate a viewpoint S21-B at the pupil 500-1 of the eye 500, and light L2-4B from the ant 800 (point T-2A) and light L2-2B from the house 700 (point T-1B) generate a viewpoint S22-B at the pupil 500-1 of the eye 500 (that is, two viewpoints are generated in total). Then, the light L2-1B and the light L2-2B from the house 700 (point T-1B) are converged on the retina of the eye 500 with the two viewpoints (the viewpoint S21-B and the viewpoint S22-B) being in focus, and are seen as a house 700a, so that there is no blur. On the other hand, the light L2-3B and the light L2-4B from the ant 800 (point T-2B) are not converged on the retina of the eye 500 with the two viewpoints (the viewpoint S21-B and the viewpoint S22-B) being out of focus, and are seen as ants 800a-1 and 800a-2, so that there is a blur.

When the number of viewpoints generated simultaneously increases, rays of an object out of focus deviate in a multiple manner so that a focus blur is reproduced. In this way, a state in which a large number of viewpoints are generated on pupils is called a super multi-view, which is said to cause focusing. As described above, a large number of viewpoints need to be generated at such intervals as to be perceived to be simultaneous by humans. Note that the above-described SMVD is compatible by varying a position of the light source that emits light and an image displayed on the spatial light modulator at a high speed, but the speed may be insufficient to achieve colorization or a large eye-box.

The image display apparatus of the first embodiment according to the present technology can simultaneously generate two viewpoints with a simple structure, and can form the super-multiple view at a high speed. Note that, similarly, each of the image display apparatuses of the second to seventh embodiments according to the present technology as described later can also simultaneously generate two viewpoints with a simple structure, and can form the super-multiple view at a high speed.

As illustrated in FIG. 3 as described later, one image forming apparatus (for example, spatial light modulator) is installed to be perpendicular to the optical axis of the lens (for example, collimator lens), and another image forming apparatus (for example, spatial light modulator) is installed to be inclined with respect to the optical axis, so that it is possible to simultaneously generate two different viewpoints when one point light source emits light. As described above, the image display apparatus of the first embodiment according to the present technology includes the at least two image forming apparatuses (for example, spatial light modulators). In the image display apparatus of the first embodiment according to the present technology, there is no drive unit such as a galvanometer mirror, and the two viewpoints can be simultaneously generated by one light source, so that a mechanism can be simplified.

Furthermore, it is unnecessary to align optical axes of the two viewpoints, so that adjustment can be simplified.

A description will be given with reference to FIG. 3. FIG. 3 illustrates an image display apparatus 103. The image display apparatus 103 includes an image display apparatus 103-L for a left eye and an image display apparatus 103-R for a right eye.

The image display apparatus 103-L includes a point light source array 1-L, two reflective spatial light modulators 5-1-L and 5-2-L, two quarter-wave plates 30-1-L and 30-2-L, a half mirror 3-L, a collimator lens 2-L, and an eyepiece 4-L. In the image display apparatus 103-L, a wavelength variable filter 9-L is disposed between the point light source array 1-L and the collimator lens 2-L.

Out of the two reflective spatial light modulators 5-1-L and 5-2-L, the first reflective spatial light modulator 5-1-L is provided in a predetermined angular direction with respect to an optical axis (axis in the left-right direction in FIG. 3) of the collimator lens 2-L. In FIG. 3, the predetermined angle is a clockwise angle (negative angle) with respect to the optical axis of the collimator lens 2-L, which is any angle of more than 0 degrees to less than 90 degrees. The second reflective image forming apparatus 5-2-L is provided in a direction substantially perpendicular to the optical axis (axis in the left-right direction in FIG. 3) of the collimator lens 2-L.

Meanwhile, the first reflective spatial light modulator 5-1-L may be provided in the direction substantially parallel to the optical axis (axis in the left-right direction in FIG. 3) of the collimator lens 2-L, and the second reflective image forming apparatus 5-2-L may be provided in the predetermined angular direction with respect to the optical axis (axis in the left-right direction in FIG. 3) of the collimator lens 2-L.

The image display apparatus 103-L may further include a control apparatus (not illustrated). The control apparatus is connected to each of the point light source array 1-L, the wavelength conversion filter 9-L, the first reflective spatial light modulator 5-1-L, and the second reflective spatial light modulator 5-2-L. The control apparatus can control a viewpoint to be generated by synchronizing a position of a point light source of the point light source array 1-L, a wavelength converted by the wavelength conversion filter 9-L, and first image light L3A-L and first image light L30A-L emitted from the first reflective spatial light modulator 5-1-L and second image light L3B-L and second image light L30B-L emitted from the second reflective spatial light modulator 5-2-L.

The light L3-L emitted from the point light source array 1-L via the wavelength variable filter 9-L passes through the collimator lens 2-L to be parallel light, is reflected by the half mirror 3-L (at a spot W3-L), passes through the quarter-wave plate 30-1-L, and is incident on the first reflective spatial light modulator 5-1-L. On the other hand, the light L30-L emitted from the point light source array 1-L via the wavelength variable filter 9-L passes through the collimator lens 2-L to be parallel light, is reflected by the half mirror 3-L (at a spot W30-L), passes through the quarter-wave plate 30-1-L, and is incident on the first reflective spatial light modulator 5-1-L.

Furthermore, the light L3-L emitted from the point light source array 1-L via the wavelength variable filter 9-L passes through the collimator lens 2-L to be parallel light, is transmitted through the half mirror 3-L (the spot W3-L), passes through the quarter-wave plate 30-2-L, and is incident on the second reflective spatial light modulator 5-2-L. On the other hand, the light L30-L emitted from the point light source array 1-L via the wavelength variable filter 9-L passes through the collimator lens 2-L to be parallel light, is transmitted through the half mirror 3-L (the spot W30-L), passes through the quarter-wave plate 30-2-L, and is incident on the second reflective spatial light modulator 5-2-L.

The light L3-L incident on the first reflective spatial light modulator 5-1-L is emitted from the first reflective spatial light modulator 5-1-L as the first image light L3A-L, passes through the quarter-wave plate 30-1-L, is transmitted through the half mirror 3-L (a transmission spot is a spot different from the spot W3-L), and is incident on a left eye 500-L (a pupil 500-1-L). On the other hand, the light L30-L incident on the first reflective spatial light modulator 5-1-L is emitted from the first reflective spatial light modulator 5-1-L as the first image light L30A-L, passes through the quarter-wave plate 30-1-L, is transmitted through the half mirror 3-L (a transmission spot is a spot different from the spot W30-L), and is incident on the left eye 500-L (pupil 500-1-L). Then, the first image light L3A-L and the first image light L30A-L generate a viewpoint S31-L in the pupil 500-1-L.

Furthermore, the light L3-L incident on the second reflective spatial light modulator 5-2-L is emitted from the second reflective spatial light modulator 5-2-L as the second image light L3B-L, passes through the quarter-wave plate 30-2-L, is reflected by the half mirror 3-L (at the spot W3-L), and is incident on the left eye 500-L (pupil 500-1-L). On the other hand, the light L30-L incident on the second reflective spatial light modulator 5-2-L is emitted from the second reflective spatial light modulator 5-2-L as the second image light L30B-L, passes through the quarter-wave plate 30-2-L, is reflected by the half mirror 3-L (at the spot W30-L), and is incident on the left eye 500-L (pupil 500-1-L). Then, the second image light L3B-L and the second image light L30B-L generate a viewpoint S32-L in the pupil 500-1-L.

As described above, the image display apparatus 103-L can simultaneously generate the viewpoint S31-L and the viewpoint S32-L which are two viewpoints.

The image display apparatus 103-R includes a point light source array 1-R, two reflective spatial light modulators 5-1-R and 5-2-R, two quarter-wave plates 30-1-R and 30-2-R, a half mirror 3-R, a collimator lens 2-R, and an eyepiece 4-R. In the image display apparatus 103-R, a wavelength variable filter 9-R is disposed between the point light source array 1-R and the collimator lens 2-R.

Out of the two reflective spatial light modulators 5-1-R and 5-2-R, the first reflective spatial light modulator 5-1-R is provided in a predetermined angular direction with respect to an optical axis (axis in the left-right direction in FIG. 3) of the collimator lens 2-R. In FIG. 3, the predetermined angle is a counterclockwise angle (positive angle) with respect to the optical axis of the collimator lens 2-R, which is any angle of more than 0 degrees to less than 90 degrees. The second reflective spatial light modulator 5-2-R is provided in a direction substantially perpendicular to the optical axis (axis in the left-right direction in FIG. 3) of the collimator lens 2-R.

Meanwhile, the first reflective spatial light modulator 5-1-R may be provided in the direction substantially parallel to the optical axis (axis in the left-right direction in FIG. 3)

of the collimator lens 2-R, and the second reflective image forming apparatus 5-2-R may be provided in the predetermined angular direction with respect to the optical axis (axis in the left-right direction in FIG. 3) of the collimator lens 2-R.

The image display apparatus 103-R may further include a control apparatus (not illustrated). The control apparatus is connected to each of the point light source array 1-R, the wavelength conversion filter 9-R, the first reflective spatial light modulator 5-1-R, and the second reflective spatial light modulator 5-2-R. The control apparatus can control a viewpoint to be generated by synchronizing a position of a point light source of the point light source array 1-R, a wavelength converted by the wavelength conversion filter 9-R, and first image light L3A-R and first image light L30A-R emitted from the first reflective spatial light modulator 5-1-R and second image light L3B-R and second image light L30B-R emitted from the second reflective spatial light modulator 5-2-R.

The light L3-R emitted from the point light source array 1-R via the wavelength variable filter 9-R passes through the collimator lens 2-R to be parallel light, is reflected by the half mirror 3-R (at a spot W3-R), passes through the quarter-wave plate 30-1-R, and is incident on the first reflective spatial light modulator 5-1-R. On the other hand, the light L30-R emitted from the point light source array 1-R via the wavelength variable filter 9-R passes through the collimator lens 2-R to be parallel light, is reflected by the half mirror 3-R (at a spot W30-R), passes through the quarter-wave plate 30-1-R, and is incident on the first reflective spatial light modulator 5-1-R.

Furthermore, the light L3-R emitted from the point light source array 1-R via the wavelength variable filter 9-R passes through the collimator lens 2-R to be parallel light, is transmitted through the half mirror 3-R (the spot W3-R), passes through the quarter-wave plate 30-2-R, and is incident on the second reflective spatial light modulator 5-2-R. On the other hand, the light L30-R emitted from the point light source array 1-R via the wavelength variable filter 9-R passes through the collimator lens 2-R to be parallel light, is transmitted through the half mirror 3-R (the spot W30-R), passes through the quarter-wave plate 30-2-R, and is incident on the second reflective spatial light modulator 5-2-R.

The light L3-R incident on the first reflective spatial light modulator 5-1-R is emitted from the first reflective spatial light modulator 5-1-R as the first image light L3A-R, passes through the quarter-wave plate 30-1-R, is transmitted through the half mirror 3-R (a transmission spot is a spot different from the spot W3-R), and is incident on a right eye 500-R (a pupil 500-1-R). On the other hand, the light L30-R incident on the first reflective spatial light modulator 5-1-R is emitted from the first reflective spatial light modulator 5-1-R as the first image light L30A-R, passes through the quarter-wave plate 30-1-R, is transmitted through the half mirror 3-R (a transmission spot is a spot different from the spot W30-R), and is incident on the right eye 500-R (pupil 500-1-R). Then, the first image light L3A-R and the first image light L30A-R generate a viewpoint S31-R in the pupil 500-1-R.

Furthermore, the light L3-R incident on the second reflective spatial light modulator 5-2-R is emitted from the second reflective spatial light modulator 5-2-R as the second image light L3B-R, passes through the quarter-wave plate 30-2-R, is reflected by the half mirror 3-R (at the spot W3-R), and is incident on the right eye 500-R (pupil 500-1-R). On the other hand, the light L30-R incident on the second reflective spatial light modulator 5-2-R is emitted from the second reflective spatial light modulator 5-2-R as the second image light L30B-R, passes through the quarter-wave plate 30-2-R, is reflected by the half mirror 3-R (at the spot W30-R), and is incident on the right eye 500-R (pupil 500-1-R). Then, the second image light L3B-R and the second image light L30B-R generate a viewpoint S32-R in the pupil 500-1-R.

As described above, the image display apparatus 103-R can simultaneously generate the viewpoint S31-R and the viewpoint S32-R which are two viewpoints.

Figure 4:
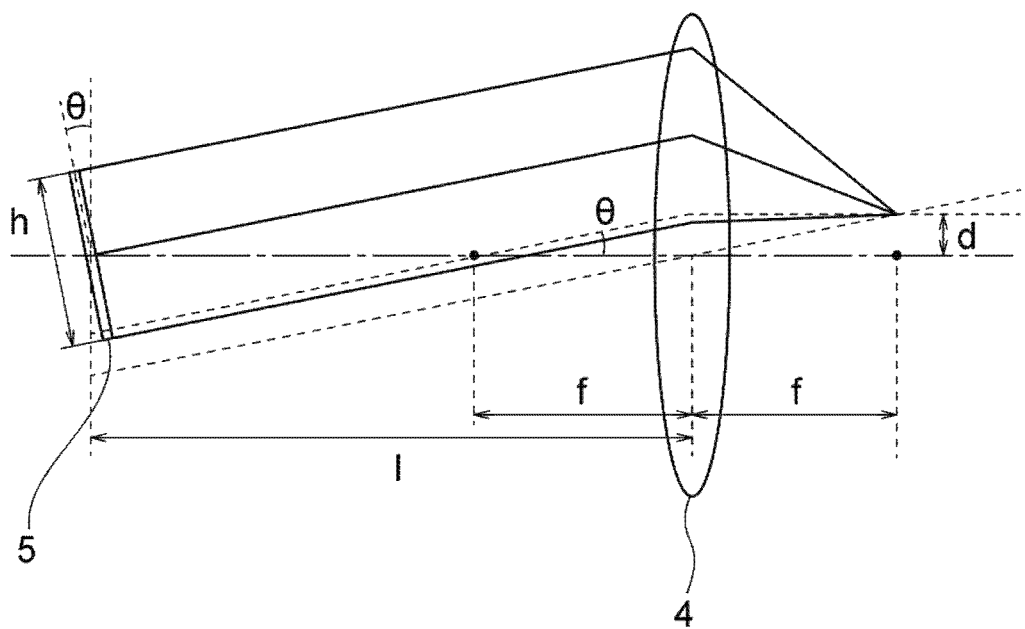
FIG. 4 is a diagram for describing a relationship between an angle of an image forming apparatus (spatial light modulator) and a position of a viewpoint.

FIG. 4 is a diagram for describing a relationship between an angle of the image forming apparatus (spatial light modulator) and a position of a viewpoint.

An angle θ at which one spatial light modulator 5 is inclined with respect to the optical axis can be obtained from a focal length f of the eyepiece 4 and an interval d between the viewpoints as illustrated in FIG. 4 as in the following Formula (1). For example, when the focal length f=30 mm and the viewpoint interval d=2 mm, the angle is obtained as θ=3.8°. In FIG. 4, 1 is a distance from the eyepiece (the center of the eyepiece) to the spatial light modulator 5, and h is a length (height) of the spatial light modulator 5.

$$\theta = \tan^{-1} d/f \qquad \text{Formula (1)}$$

As described above, the contents described for the image display apparatus of the first embodiment (Example 1 of the image display apparatus) according to the present technology can be applied to the image display apparatuses of the second to seventh embodiments according to the present technology as described later as long as there is no particular technical contradiction.

3. Second Embodiment (Example 2 of Image Display Apparatus)

The image display apparatus of the second embodiment (Example 2 of the image display apparatus) according to the present technology includes a light source, at least two image forming apparatuses, a quarter-wave plate, a beam splitter, a lens, and an eyepiece for each of eyes of a user. In the image display apparatus of the second embodiment according to the present technology, out of the at least two image forming apparatuses, a first image forming apparatus is provided in a predetermined angular direction with respect to an optical axis of the lens, and a second image forming apparatus is provided in a direction substantially perpendicular to the optical axis of the lens. Furthermore, in the image display apparatus of the second embodiment according to the present technology, light emitted from the light source is incident on the first image forming apparatus and the second image forming apparatus via the lens, the beam splitter, and the quarter-wave plate in this order, and first image light emitted from the first image forming apparatus and second image light emitted from the second image forming apparatus are incident on each of the eyes of the user via the quarter-wave plate, the beam splitter, and the eyepiece in this order.

Moreover, in the image display apparatus of the second embodiment according to the present technology, each of the first image forming apparatus and the second image forming apparatus includes a ferroelectric liquid crystal on silicon (FLCOS) device, the light source is a point light source array, and a filter wheel is disposed between the point light source array and the lens.

With respect to the optical axis of the lens, the first image forming apparatus is provided in the predetermined angular direction as described above, and may be provided for example, at any angle of more than 0 degrees to less than 90 degrees.

Examples of the beam splitter include a half mirror and the like. Examples of the lens include a collimator lens.

Hereinafter, the image display apparatus of the second embodiment (Example 2 of the image display apparatus) according to the present technology will be described with reference to FIG. 5.

Figure 5:
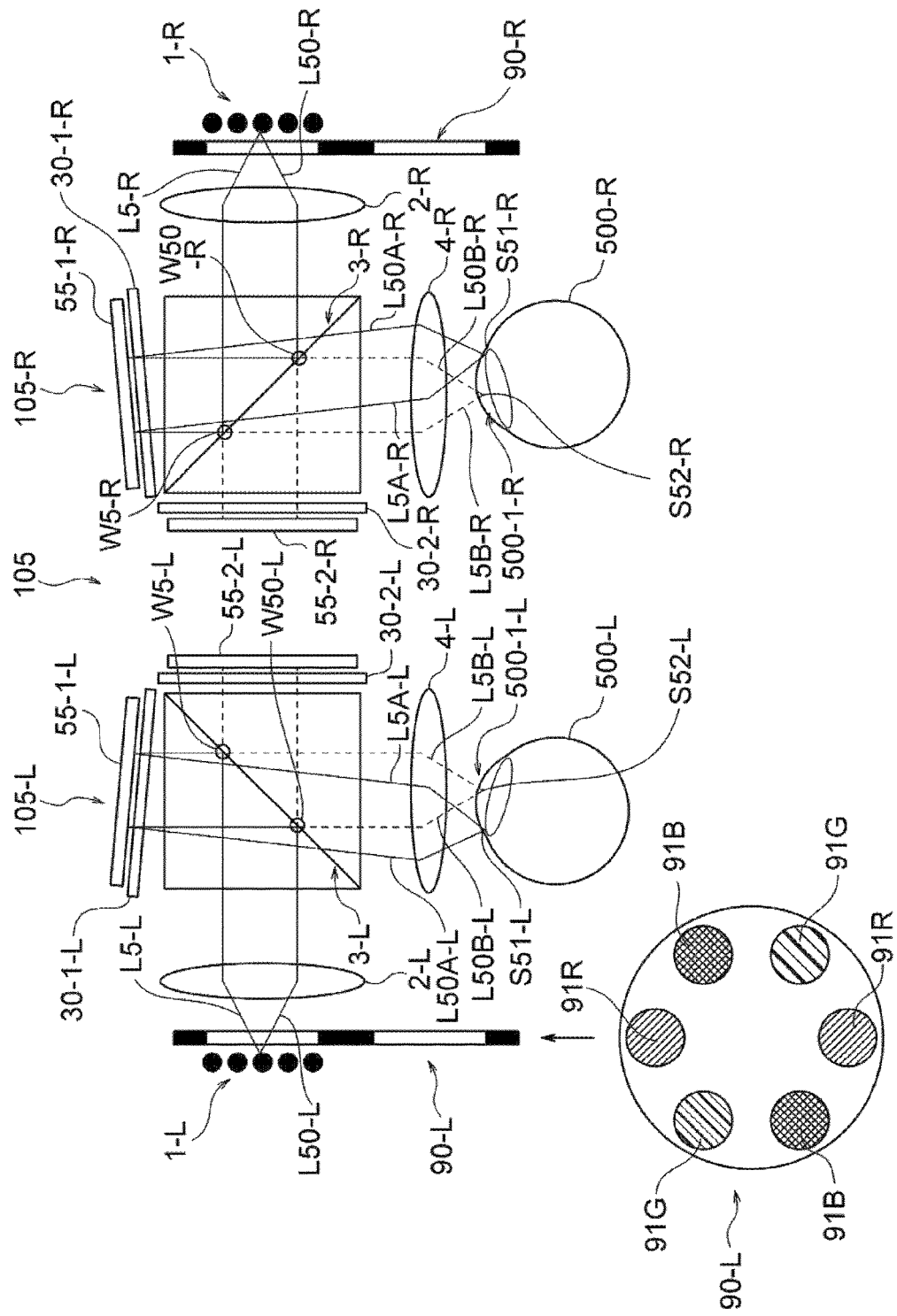
FIG. 5 is a diagram illustrating a configuration example of an image display apparatus according to a second embodiment to which the present technology is applied.

FIG. 5 illustrates an image display apparatus 105. The image display apparatus 105 includes an image display apparatus 105-L for a left eye and an image display apparatus 105-R for a right eye.

The image display apparatus 105-L includes a point light source array 1-L, two ferroelectric liquid crystal on silicon (FLCOS) devices 55-1-L and 55-2-L, two quarter-wave plates 30-1-L and 30-2-L, a half mirror 3-L, a collimator lens 2-L, and an eyepiece 4-L. In the image display apparatus 105-L, a filter wheel 90-L is disposed between the point light source array 1-L and the collimator lens 2-L. The filter wheel 90-L has a circular shape in plan view. Then, a red (R) filter 91R, a blue (B) filter 91B, and a green (G) filter 91G are disposed in this order around the circle of the filter wheel 90-L. The filter wheel 90-L can be rotated to appropriately combine any one of the red (R) filter 91R, the blue (B) filter 91B, and the green (G) filter 91G with a point light source such that light having a desired wavelength range is emitted.

Out of the two ferroelectric liquid crystal on silicon (FLCOS) devices 55-1-L and 55-2-L, the first FLCOS device 55-1-L is provided in a predetermined angular direction with respect to an optical axis (axis in the left-right direction in FIG. 5) of the collimator lens 2-L. In FIG. 5, the predetermined angle is a clockwise angle (negative angle) with respect to the optical axis of the collimator lens 2-L, which is any angle of more than 0 degrees to less than 90 degrees. The second FLCOS device 55-2-L is provided in a direction substantially perpendicular to the optical axis (axis in the left-right direction in FIG. 5) of the collimator lens 2-L.

Meanwhile, the first FLCOS device 55-1-L may be provided in the direction substantially parallel to the optical axis (the axis in the left-right direction in FIG. 5) of the collimator lens 2-L, and the second FLCOS device 55-2-L may be provided in the predetermined angular direction with respect to the optical axis (the axis in the left-right direction in FIG. 5) of the collimator lens 2-L.

The image display apparatus 105-L may further include a control apparatus (not illustrated). The control apparatus is connected to each of the point light source array 1-L, the filter wheel 90-L, the first FLCOS device 55-1-L, and the second FLCOS device 55-2-L. The control apparatus can control a viewpoint to be generated by synchronizing a position of a point light source of the point light source array 1-L, a color of at least one of the red (R) filter 91R, the green (G) filter 91G, or the blue (B) filter 91B constituting the filter wheel 90-L, and first image light L5A-L and first image light L50A-L emitted from the first FLCOS device 55-1-L and second image light L5B-L and second image light L50B-L emitted from the second FLCOS device 55-2-L.

The light L5-L emitted from the point light source array 1-L via the filter wheel 90-L passes through the collimator lens 2-L to be parallel light, is reflected by the half mirror 3-L (at a spot W5-L), passes through the quarter-wave plate 30-1-L, and is incident on the first FLCOS device 55-1-L. On the other hand, the light L50-L emitted from the point light source array 1-L via the filter wheel 90-L passes through the collimator lens 2-L to be parallel light, is reflected by the half mirror 3-L (at a spot W50-L), passes through the quarter-wave plate 30-1-L, and is incident on the first FLCOS device 55-1-L.

Furthermore, the light L5-L emitted from the point light source array 1-L via the filter wheel 90-L passes through the collimator lens 2-L to be parallel light, is transmitted through the half mirror 3-L (the spot W5-L), passes through the quarter-wave plate 30-2-L, and is incident on the second FLCOS device 55-2-L. On the other hand, the light L50-L emitted from the point light source array 1-L via the filter wheel 90-L passes through the collimator lens 2-L to be parallel light, is transmitted through the half mirror 3-L (the spot W50-L), passes through the quarter-wave plate 30-2-L, and is incident on the second FLCOS device 55-2-L.

The light L5-L incident on the first FLCOS device 55-1-L is emitted from the first FLCOS device 55-1-L as the first image light L5A-L, passes through the quarter-wave plate 30-1-L, is transmitted through the half mirror 3-L (a transmission spot is a spot different from the spot W5-L), and is incident on a left eye 500-L (a pupil 500-1-L). On the other hand, the light L50-L incident on the first FLCOS device 55-1-L is emitted from the first FLCOS device 55-1-L as the first image light L50A-L, passes through the quarter-wave plate 30-1-L, is transmitted through the half mirror 3-L (a transmission spot is a spot different from the spot W50-L), and is incident on the left eye 500-L (pupil 500-1-L). Then, the first image light L5A-L and the first image light L50A-L generate a viewpoint S51-L in the pupil 500-1-L.

Furthermore, the light L5-L incident on the second FLCOS device 55-2-L is emitted from the second FLCOS device 55-2-L as the second image light L5B-L, passes through the quarter-wave plate 30-2-L, is reflected by the half mirror 3-L (at the spot W5-L), and is incident on the left eye 500-L (pupil 500-1-L). On the other hand, the light L50-L incident on the second FLCOS device 55-2-L is emitted from the second FLCOS device 55-2-L as the second image light L50B-L, passes through the quarter-wave plate 30-2-L, is reflected by the half mirror 3-L (at the spot W50-L), and is incident on the left eye 500-L (pupil 500-1-L). Then, the second image light L5B-L and the second image light L50B-L generate a viewpoint S52-L in the pupil 500-1-L.

As described above, the image display apparatus 105-L can simultaneously generate the viewpoint S51-L and the viewpoint S52-L which are two viewpoints.

The image display apparatus 105-R includes a point light source array 1-R, two ferroelectric liquid crystal on silicon (FLCOS) devices 55-1-R and 55-2-R, two quarter-wave plates 30-1-R and 30-2-R, a half mirror 3-R, a collimator lens 2-R, and an eyepiece 4-R. In the image display apparatus 105-R, a filter wheel 90-R is disposed between the point light source array 1-R and the collimator lens 2-R. Although not illustrated, the filter wheel 90-R has a circular shape in plan view, and a red (R) filter, a blue (B) filter, and a green (G) filter are disposed in this order around the circle of the filter wheel 90-R. The filter wheel 90-R can be rotated to appropriately combine any one of the red (R) filter, the blue (B) filter, and the green (G) filter with a point light source such that light having a desired wavelength range is emitted.

Out of the two ferroelectric liquid crystal on silicon (FLCOS) devices 55-1-R and 55-2-R, the first FLCOS device 55-1-R is provided in a predetermined angular direction with respect to an optical axis (axis in the left-right direction in FIG. 5) of the collimator lens 2-R. In FIG. 5, the predetermined angle is a counterclockwise angle (positive angle) with respect to the optical axis of the collimator lens 2-R, which is any angle of more than 0 degrees to less than 90 degrees. The second FLCOS device 55-2-R is provided in a direction substantially perpendicular to the optical axis (axis in the left-right direction in FIG. 5) of the collimator lens 2-R.

Meanwhile, the first FLCOS device 55-1-R may be provided in the direction substantially parallel to the optical axis (the axis in the left-right direction in FIG. 5) of the collimator lens 2-R, and the second FLCOS device 55-2-R may be provided in the predetermined angular direction with respect to the optical axis (the axis in the left-right direction in FIG. 5) of the collimator lens 2-R.

The image display apparatus 105-R may further include a control apparatus (not illustrated). A control apparatus 900 is connected to each of the point light source array 1-R, the filter wheel 90-R, the first FLCOS device 55-1-R, and the second FLCOS device 55-2-R. The control apparatus can control a viewpoint to be generated by synchronizing a position of a point light source of the point light source array 1-R, a color of at least one of the red (R) filter 91R, the green (G) filter 91G, or the blue (B) filter 91B constituting the filter wheel 90-R, and first image light L5A-R and first image light L50A-R emitted from the first FLCOS device 55-1-R and second image light L5B-R and second image light L50B-R emitted from the second FLCOS device 55-2-R.

The light L5-R emitted from the point light source array 1-R via the filter wheel 90-R passes through the collimator lens 2-R to be parallel light, is reflected by the half mirror 3-R (at a spot W5-R), passes through the quarter-wave plate 30-1-R, and is incident on the first FLCOS device 55-1-R. On the other hand, the light L50-R emitted from the point light source array 1-R via the filter wheel 90-R passes through the collimator lens 2-R to be parallel light, is reflected by the half mirror 3-R (at a spot W50-R), passes through the quarter-wave plate 30-1-R, and is incident on the first FLCOS device 55-1-R.

Furthermore, the light L5-R emitted from the point light source array 1-R via the filter wheel 90-R passes through the collimator lens 2-R to be parallel light, is transmitted through the half mirror 3-R (the spot W5-R), passes through the quarter-wave plate 30-2-R, and is incident on the second FLCOS device 55-2-R. On the other hand, the light L50-R emitted from the point light source array 1-R via the filter wheel 90-R passes through the collimator lens 2-R to be parallel light, is transmitted through the half mirror 3-R (the spot W50-R), passes through the quarter-wave plate 30-2-R, and is incident on the second FLCOS device 55-2-R.

The light L5-R incident on the first FLCOS device 55-1-R is emitted from the first FLCOS device 55-1-R as the first image light L5A-R, passes through the quarter-wave plate 30-1-R, is transmitted through the half mirror 3-R (a transmission spot is a spot different from the spot W5-R), and is incident on a right eye 500-R (a pupil 500-1-R). On the other hand, the light L50-R incident on the first FLCOS device 55-1-R is emitted from the first FLCOS device 55-1-R as the first image light L50A-R, passes through the quarter-wave plate 30-1-R, is transmitted through the half mirror 3-R (a transmission spot is a spot different from the spot W50-R), and is incident on the right eye 500-R (pupil 500-1-R). Then, the first image light L5A-R and the first image light L50A-R generate a viewpoint S51-R in the pupil 500-1-R.

Furthermore, the light L5-R incident on the second FLCOS device 55-2-R is emitted from the second FLCOS device 55-2-R as the second image light L5B-R, passes through the quarter-wave plate 30-2-R, is reflected by the half mirror 3-R (at the spot W5-R), and is incident on the right eye 500-R (pupil 500-1-R). On the other hand, the light L50-R incident on the second FLCOS device 55-2-R is emitted from the second FLCOS device 55-2-R as the second image light L50B-R, passes through the quarter-wave plate 30-2-R, is reflected by the half mirror 3-R (at the spot W50-R), and is incident on the right eye 500-R (pupil 500-1-R). Then, the second image light L5B-R and the second image light L50B-R generate a viewpoint S52-R in the pupil 500-1-R.

As described above, the image display apparatus 105-R can simultaneously generate the viewpoint S51-R and the viewpoint S52-R which are two viewpoints.

As described above, the contents described for the image display apparatus of the second embodiment (Example 2 of the image display apparatus) according to the present technology can be applied to the image display apparatus of the first embodiment according to the present technology described above and the image display apparatuses of the third to seventh embodiments according to the present technology as described later as long as there is no particular technical contradiction.

4. Third Embodiment (Example 3 of Image Display Apparatus)

The image display apparatus of the third embodiment (Example 3 of the image display apparatus) according to the present technology includes a light source, at least two image forming apparatuses, a quarter-wave plate, a beam splitter, a lens, and an eyepiece for each of eyes of a user. In the image display apparatus of the third embodiment according to the present technology, out of the at least two image forming apparatuses, a first image forming apparatus is provided in a predetermined angular direction with respect to an optical axis of the lens, and a second image forming apparatus is provided in a direction substantially perpendicular to the optical axis of the lens. Furthermore, in the image display apparatus of the third embodiment according to the present technology, light emitted from the light source is incident on the first image forming apparatus and the second image forming apparatus via the lens, the beam splitter, and the quarter-wave plate in this order, and first image light emitted from the first image forming apparatus and second image light emitted from the second image forming apparatus are incident on each of the eyes of the user via the quarter-wave plate, the beam splitter, and the eyepiece in this order.

Moreover, in the image display apparatus of the third embodiment according to the present technology, each of the first image forming apparatus and the second image forming apparatus includes a ferroelectric liquid crystal on silicon (FLCOS) device, and the light source is a polychromatic point light source array.

With respect to the optical axis of the lens, the first image forming apparatus is provided in the predetermined angular direction as described above, and may be provided for example, at any angle of more than 0 degrees to less than 90 degrees.

Examples of the beam splitter include a half mirror and the like. Examples of the lens include a collimator lens.

Hereinafter, the image display apparatus of the third embodiment (Example 3 of the image display apparatus) according to the present technology will be described with reference to FIG. 6.

Figure 6:
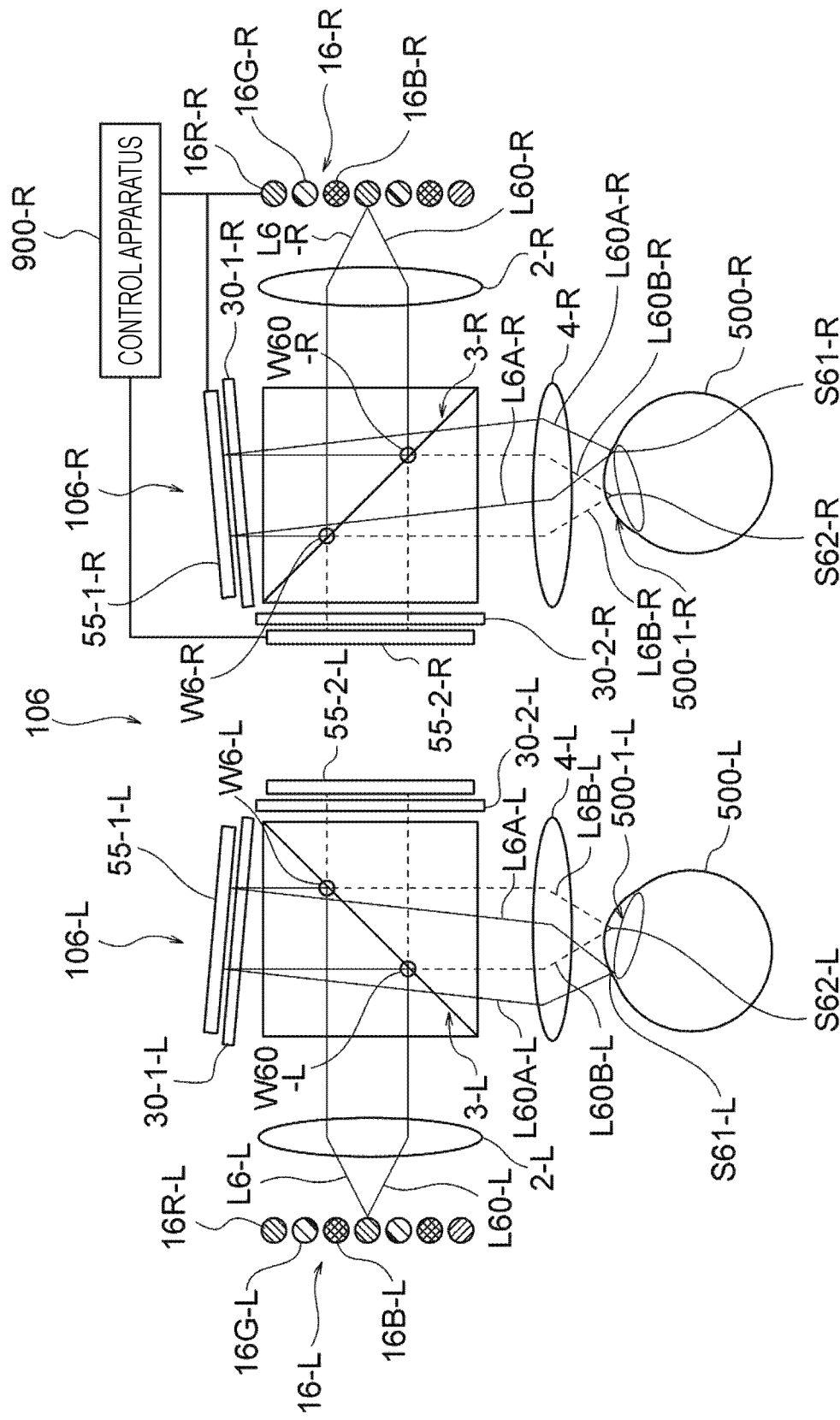
FIG. 6 is a diagram illustrating a configuration example of an image display apparatus according to a third embodiment to which the present technology is applied.

FIG. 6 illustrates an image display apparatus 106. The image display apparatus 106 includes an image display apparatus 106-L for a left eye and an image display apparatus 106-R for a right eye.

The image display apparatus 106-L includes a polychromatic point light source array 16-L, two ferroelectric liquid crystal on silicon (FLCOS) devices 55-1-L and 55-2-L, two quarter-wave plates 30-1-L and 30-2-L, a half mirror 3-L, a collimator lens 2-L, and an eyepiece 4-L. The polychromatic point light source array 16-L includes a red (R) point light source 16R-L, a green (G) point light source 16G-L, and a blue (B) point light source 16B-L in this order (a direction from the upper side to the lower side in FIG. 6). In the polychromatic point light source array 16-L, the red (R) point light source 16R-L, the green (G) point light source 16G-L, and the blue (B) point light source 16B-L are grouped as one set, and this set may be repeatedly disposed any number of times.

Out of the two ferroelectric liquid crystal on silicon (FLCOS) devices 55-1-L and 55-2-L, the first FLCOS device 55-1-L is provided in a predetermined angular direction with respect to an optical axis (axis in the left-right direction in FIG. 6) of the collimator lens 2-L. In FIG. 6, the predetermined angle is a clockwise angle (negative angle) with respect to the optical axis of the collimator lens 2-L, which is any angle of more than 0 degrees to less than 90 degrees. The second FLCOS device 55-2-L is provided in a direction substantially perpendicular to the optical axis (axis in the left-right direction in FIG. 6) of the collimator lens 2-L.

Meanwhile, the first FLCOS device 55-1-L may be provided in the direction substantially parallel to the optical axis (the axis in the left-right direction in FIG. 6) of the collimator lens 2-L, and the second FLCOS device 55-2-L may be provided in the predetermined angular direction with respect to the optical axis (the axis in the left-right direction in FIG. 6) of the collimator lens 2-L.

Light L6-L emitted from the polychromatic point light source array 16-L passes through the collimator lens 2-L to be parallel light, is reflected by the half mirror 3-L (at a spot W6-L), passes through the quarter-wave plate 30-1-L, and is incident on the first FLCOS device 55-1-L. On the other hand, light L60-L emitted from the polychromatic point light source array 16-L passes through the collimator lens 2-L to be parallel light, is reflected by the half mirror 3-L (at a spot W60-L), passes through the quarter-wave plate 30-1-L, and is incident on the first FLCOS device 55-1-L.

Furthermore, the light L6-L emitted from the polychromatic point light source array 16-L passes through the collimator lens 2-L to be parallel light, is transmitted through the half mirror 3-L (the spot W6-L), passes through the quarter-wave plate 30-2-L, and is incident on the second FLCOS device 55-2-L. On the other hand, the light L60-L emitted from the polychromatic point light source array 16-L passes through the collimator lens 2-L to be parallel light, is transmitted through the half mirror 3-L (the spot W60-L), passes through the quarter-wave plate 30-2-L, and is incident on the second FLCOS device 55-2-L.

The light L6-L incident on the first FLCOS device 55-1-L is emitted from the first FLCOS device 55-1-L as the first image light L6A-L, passes through the quarter-wave plate 30-1-L, is transmitted through the half mirror 3-L (a transmission spot is a spot different from the spot W6-L), and is incident on a left eye 500-L (a pupil 500-1-L). On the other hand, the light L60-L incident on the first FLCOS device 55-1-L is emitted from the first FLCOS device 55-1-L as the first image light L60A-L, passes through the quarter-wave plate 30-1-L, is transmitted through the half mirror 3-L (a transmission spot is a spot different from the spot W60-L), and is incident on the left eye 500-L (pupil 500-1-L). Then, the first image light L6A-L and the first image light L60A-L generate a viewpoint S61-L in the pupil 500-1-L.

Furthermore, the light L6-L incident on the second FLCOS device 55-2-L is emitted from the second FLCOS device 55-2-L as the second image light L6B-L, passes through the quarter-wave plate 30-2-L, is reflected by the half mirror 3-L (at the spot W6-L), and is incident on the left eye 500-L (pupil 500-1-L). On the other hand, the light L60-L incident on the second FLCOS device 55-2-L is emitted from the second FLCOS device 55-2-L as the second image light L60B-L, passes through the quarter-wave plate 30-2-L, is reflected by the half mirror 3-L (at the spot W60-L), and is incident on the left eye 500-L (pupil 500-1-L). Then, the second image light L6B-L and the second image light L60B-L generate a viewpoint S62-L in the pupil 500-1-L.

As described above, the image display apparatus 106-L can simultaneously generate the viewpoint S61-L and the viewpoint S62-L which are two viewpoints.

The image display apparatus 106-R includes a polychromatic point light source array 16-R, two ferroelectric liquid crystal on silicon (FLCOS) devices 55-1-R and 55-2-R, two quarter-wave plates 30-1-R and 30-2-R, a half mirror 3-R, a collimator lens 2-R, and an eyepiece 4-R. The polychromatic point light source array 16-R includes a red (R) point light source 16R-R, a green (G) point light source 16G-R, and a blue (B) point light source 16B-R in this order (a direction from the upper side to the lower side in FIG. 6). In the polychromatic point light source array 16-R, the red (R) point light source 16R-R, the green (G) point light source 16G-R, and the blue (B) point light source 16B-R are grouped as one set, and this set may be repeatedly disposed any number of times.

Out of the two ferroelectric liquid crystal on silicon (FLCOS) devices 55-1-R and 55-2-R, the first FLCOS device 55-1-R is provided in a predetermined angular direction with respect to an optical axis (axis in the left-right direction in FIG. 6) of the collimator lens 2-R. In FIG. 6, the predetermined angle is a counterclockwise angle (positive angle) with respect to the optical axis of the collimator lens 2-R, which is any angle of more than 0 degrees to less than 90 degrees. The second FLCOS device 55-2-R is provided in a direction substantially perpendicular to the optical axis (axis in the left-right direction in FIG. 6) of the collimator lens 2-R.

Meanwhile, the first FLCOS device 55-1-R may be provided in the direction substantially parallel to the optical axis (the axis in the left-right direction in FIG. 6) of the collimator lens 2-R, and the second FLCOS device 55-2-R may be provided in the predetermined angular direction with respect to the optical axis (the axis in the left-right direction in FIG. 6) of the collimator lens 2-R.

The image display apparatus 106-R further includes a control apparatus 900-R. The control apparatus 900-R is connected to each of the polychromatic point light source 16-R, the first FLCOS device 55-1-R, and the second FLCOS device 55-2-R. The control apparatus 900-R can control a viewpoint to be generated by synchronizing a position and a color of at least one point light source of the red (R) point light source 16R-R, the green (G) point light source 16G-R, or the blue (B) point light source 16B-R constituting the polychromatic point light source 16-R with the first image light L6A-L and first image light L60A-R emitted from the first FLCOS device 55-1-R and second image light L6B-R and second image light L60B-R emitted from the second FLCOS device 55-2-R. Note that the image display apparatus 106-L may also include a control apparatus as a control apparatus 900-L although not illustrated.

Light L6-R emitted from the polychromatic point light source array 16-R passes through the collimator lens 2-R to be parallel light, is reflected by the half mirror 3-R (at a spot W6-R), passes through the quarter-wave plate 30-1-R, and is incident on the first FLCOS device 55-1-R. On the other hand, light L60-R emitted from the polychromatic point light source array 16-R passes through the collimator lens 2-R to be parallel light, is reflected by the half mirror 3-R (at a spot W60-R), passes through the quarter-wave plate 30-1-R, and is incident on the first FLCOS device 55-1-R.

Furthermore, the light L6-R emitted from the polychromatic point light source array 16-R passes through the collimator lens 2-R to be parallel light, is transmitted through the half mirror 3-R (the spot W6-R), passes through the quarter-wave plate 30-2-R, and is incident on the second FLCOS device 55-2-R. On the other hand, the light L60-R emitted from the polychromatic point light source array 16-R passes through the collimator lens 2-R to be parallel light, is transmitted through the half mirror 3-R (the spot W60-R), passes through the quarter-wave plate 30-2-R, and is incident on the second FLCOS device 55-2-R.

The light L6-R incident on the first FLCOS device 55-1-R is emitted from the first FLCOS device 55-1-R as first image light L6A-R, passes through the quarter-wave plate 30-1-R, is transmitted through the half mirror 3-R (a transmission spot is a spot different from the spot W6-R), and is incident on a right eye 500-R (a pupil 500-1-R). On the other hand, the light L60-R incident on the first FLCOS device 55-1-R is emitted from the first FLCOS device 55-1-R as the first image light L60A-R, passes through the quarter-wave plate 30-1-R, is transmitted through the half mirror 3-R (a transmission spot is a spot different from the spot W60-R), and is incident on the right eye 500-R (pupil 500-1-R). Then, the first image light L6A-R and the first image light L60A-R generate a viewpoint S61-R in the pupil 500-1-R.

Furthermore, the light L6-R incident on the second FLCOS device 55-2-R is emitted from the second FLCOS device 55-2-R as the second image light L6B-R, passes through the quarter-wave plate 30-2-R, is reflected by the half mirror 3-R (at the spot W6-R), and is incident on the right eye 500-R (pupil 500-1-R). On the other hand, the light L60-R incident on the second FLCOS device 55-2-R is emitted from the second FLCOS device 55-2-R as the second image light L60B-R, passes through the quarter-wave plate 30-2-R, is reflected by the half mirror 3-R (at the spot W60-R), and is incident on the right eye 500-R (pupil 500-1-R). Then, the second image light L6B-R and the second image light L60B-R generate a viewpoint S62-R in the pupil 500-1-R.

As described above, the image display apparatus 106-R can simultaneously generate the viewpoint S61-R and the viewpoint S62-R which are two viewpoints.

As described above, the contents described for the image display apparatus of the third embodiment (Example 3 of the image display apparatus) according to the present technology can be applied to the image display apparatuses of the first and second embodiments according to the present technology described above and the image display apparatuses of the fourth to seventh embodiments according to the present technology as described later as long as there is no particular technical contradiction.

5. Fourth Embodiment (Example 4 of Image Display Apparatus)

The image display apparatus of the fourth embodiment (Example 4 of the image display apparatus) according to the present technology includes a light source, at least two image forming apparatuses, a quarter-wave plate, a beam splitter, a lens, and an eyepiece for each of eyes of a user. In the image display apparatus of the fourth embodiment according to the present technology, out of the at least two image forming apparatuses, a first image forming apparatus is provided in a predetermined angular direction with respect to an optical axis of the lens, and a second image forming apparatus is provided in a direction substantially perpendicular to the optical axis of the lens. Furthermore, in the image display apparatus of the fourth embodiment according to the present technology, light emitted from the light source is incident on the first image forming apparatus and the second image forming apparatus via the lens, the beam splitter, and the quarter-wave plate in this order, and first image light emitted from the first image forming apparatus and second image light emitted from the second image forming apparatus are incident on each of the eyes of the user via the quarter-wave plate, the beam splitter, and the eyepiece in this order.

Moreover, in the image display apparatus of the fourth embodiment according to the present technology, each of the first image forming apparatus and the second image forming apparatus includes a digital mirror device, the light source is a point light source array, and a liquid crystal tunable filter is disposed between the point light source array and the lens.

With respect to the optical axis of the lens, the first image forming apparatus is provided in the predetermined angular direction as described above, and may be provided for example, at any angle of more than 0 degrees to less than 90 degrees.

Examples of the beam splitter include a half mirror and the like. Examples of the lens include a collimator lens.

Hereinafter, the image display apparatus of the fourth embodiment (Example 4 of the image display apparatus) according to the present technology will be described with reference to FIG. 7.

Figure 7:
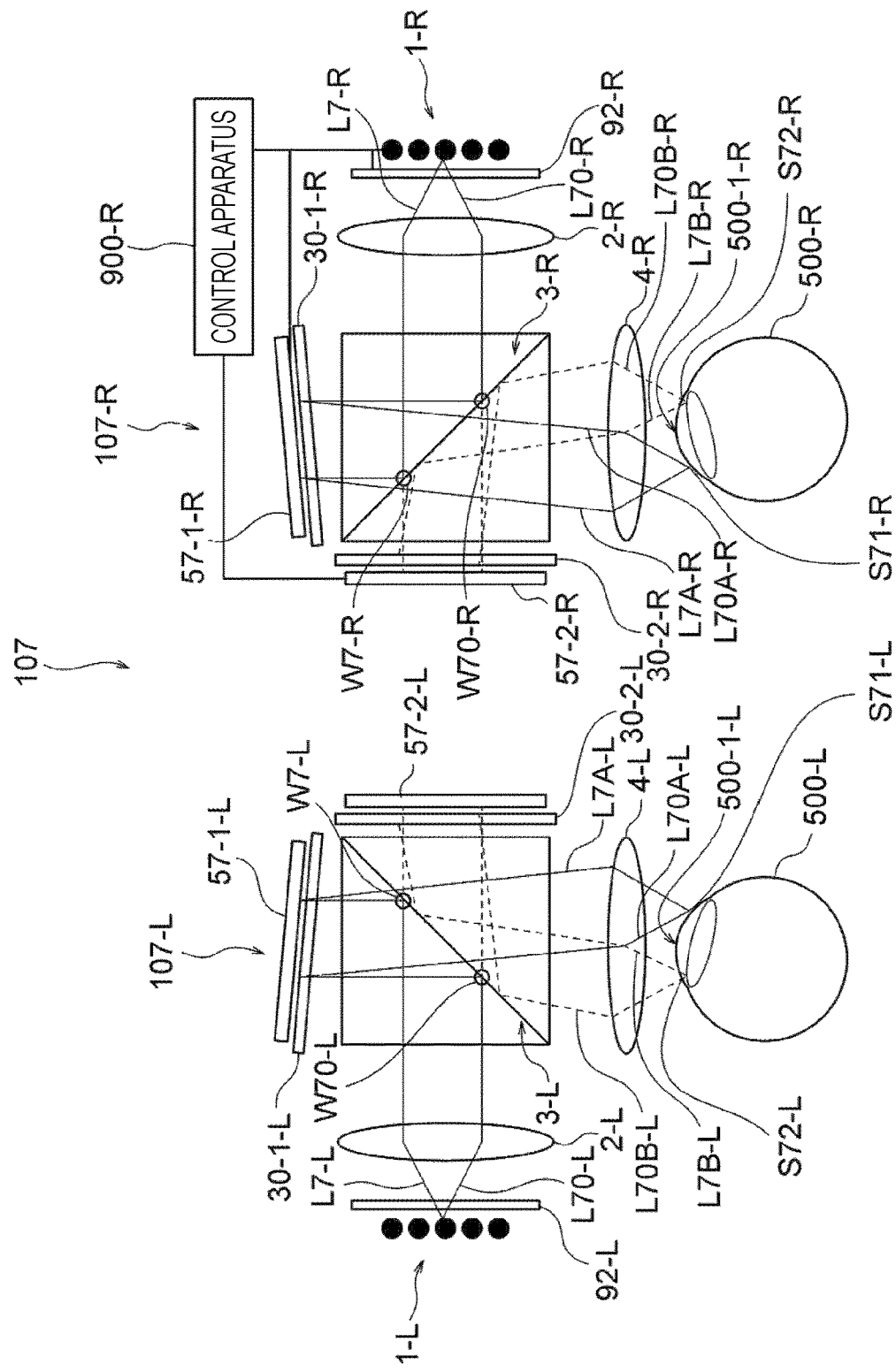
FIG. 7 is a diagram illustrating a configuration example of an image display apparatus according to a fourth embodiment to which the present technology is applied.

FIG. 7 illustrates an image display apparatus 107. The image display apparatus 107 includes an image display apparatus 107-L for a left eye and an image display apparatus 107-R for a right eye.

The image display apparatus 107-L includes a point light source array 1-L, two digital mirror devices 57-1-L and 57-2-L, two quarter-wave plates 30-1-L and 30-2-L, a half mirror 3-L, a collimator lens 2-L, and an eyepiece 4-L. In the image display apparatus 107-L, a liquid crystal tunable filter 92-L is disposed between the point light source array 1-L and the collimator lens 2-L.

Out of the two digital mirror devices 57-1-L and 57-2-L, the first digital mirror device 57-1-L is provided in a predetermined angular direction with respect to an optical axis (axis in the left-right direction in FIG. 7) of the collimator lens 2-L. In FIG. 7, the predetermined angle is a clockwise angle (negative angle) with respect to the optical axis of the collimator lens 2-L, which is any angle of more than 0 degrees to less than 90 degrees. The second digital mirror device 57-2-L is provided in a direction substantially perpendicular to the optical axis (axis in the left-right direction in FIG. 7) of collimator lens 2-L.

Meanwhile, the first digital mirror device 57-1-L may be provided in the direction substantially parallel to the optical axis (the axis in the left-right direction in FIG. 7) of the collimator lens 2-L, and the second digital mirror device 57-2-L may be provided in the predetermined angular direction with respect to the optical axis (the axis in the left-right direction in FIG. 7) of the collimator lens 2-L.

Light L7-L emitted from the point light source array 1-L via the liquid crystal tunable filter 92-L passes through the collimator lens 2-L to be parallel light, is reflected by the half mirror 3-L (at a spot W7-L), passes through the quarter-wave plate 30-1-L, and is incident on the first digital mirror device 57-1-L. On the other hand, light L70-L emitted from the point light source array 1-L via the liquid crystal tunable filter 92-L passes through the collimator lens 2-L to be parallel light, is reflected by the half mirror 3-L (at a spot W70-L), passes through the quarter-wave plate 30-1-L, and is incident on the first digital mirror device 57-1-L.

Furthermore, the light L7-L emitted from the point light source array 1-L via the liquid crystal tunable filter 92-L passes through the collimator lens 2-L to be parallel light, is transmitted through the half mirror 3-L (the spot W7-L), passes through the quarter-wave plate 30-2-L, and is incident on the second digital mirror device 57-2-L. On the other hand, the light L70-L emitted from the point light source array 1-L via the liquid crystal tunable filter 92-L passes through the collimator lens 2-L to be parallel light, is transmitted through the half mirror 3-L (the spot W70-L), passes through the quarter-wave plate 30-2-L, and is incident on the second digital mirror device 57-2-L.

The light L7-L incident on the first digital mirror device 57-1-L is emitted from the first digital mirror device 57-1-L as first image light L7A-L, passes through the quarter-wave plate 30-1-L, is transmitted through the half mirror 3-L (a transmission spot is a spot different from the spot W7-L), and is incident on a left eye 500-L (a pupil 500-1-L). On the other hand, the light L70-L incident on the first digital mirror device 57-1-L is emitted from the first digital mirror device 57-1-L as first image light L70A-L, passes through the quarter-wave plate 30-1-L, is transmitted through the half mirror 3-L (a transmission spot is a spot different from the spot W70-L), and is incident on a left eye 500-L (a pupil 500-1-L). Then, the first image light L7A-L and the first image light L70A-L generate a viewpoint S71-L in the pupil 500-1-L.

Furthermore, the light L7-L incident on the second digital mirror device 57-2-L is emitted from the second digital mirror device 57-2-L as second image light L7B-L, passes through the quarter-wave plate 30-2-L, is reflected by the half mirror 3-L (a reflection spot is a spot different from the spot W7-L), and is incident on the left eye 500-L (pupil 500-1-L). On the other hand, the light L70-L incident on the second digital mirror device 57-2-L is emitted from the second digital mirror device 57-2-L as second image light L70B-L, passes through the quarter-wave plate 30-2-L, is reflected by the half mirror 3-L (a reflection spot is a spot different from the spot W70-L), and is incident on the left eye 500-L (pupil 500-1-L). Then, the second image light L7B-L and the second image light L70B-L generate a viewpoint S72-L in the pupil 500-1-L.

As described above, the image display apparatus 107-L can simultaneously generate the viewpoint S71-L and the viewpoint S72-L which are two viewpoints.

The image display apparatus 107-R includes a point light source array 1-R, two digital mirror devices 57-1-R and 57-2-R, two quarter-wave plates 30-1-R and 30-2-R, a half mirror 3-R, a collimator lens 2-R, and an eyepiece 4-R. In the image display apparatus 107-R, a liquid crystal tunable filter 92-R is disposed between the point light source array 1-R and the collimator lens 2-R.

Out of the two digital mirror devices 57-1-R and 57-2-R, the first digital mirror device 57-1-R is provided in a predetermined angular direction with respect to an optical axis (axis in the left-right direction in FIG. 7) of the collimator lens 2-R. In FIG. 7, the predetermined angle is a counterclockwise angle (positive angle) with respect to the optical axis of the collimator lens 2-R, which is any angle of more than 0 degrees to less than 90 degrees. The second digital mirror device 57-2-R is provided in a direction substantially perpendicular to the optical axis (axis in the left-right direction in FIG. 7) of collimator lens 2-R.

Meanwhile, the first digital mirror device 57-1-R may be provided in the direction substantially parallel to the optical axis (the axis in the left-right direction in FIG. 7) of the collimator lens 2-R, and the second digital mirror device 57-2-R may be provided in the predetermined angular direction with respect to the optical axis (the axis in the left-right direction in FIG. 7) of the collimator lens 2-R.

The image display apparatus 107-R further includes a control apparatus 900-R. The control apparatus 900-R is connected to each of the point light source array 1-R, the liquid crystal tunable filter 92-R, the first digital mirror device 57-1-R, and the second digital mirror device 57-2-R. The control apparatus 900-R can control a viewpoint to be generated by synchronizing a position of a point light source of the point light source array 1-R, a wavelength tuned by the liquid crystal tunable filter 92-R, and first image light L7A-R and first image light L70A-R emitted from the first digital mirror device 57-1-R and second image light L7B-R and second image light L70B-R emitted from the second digital mirror device 57-2-R. Note that the image display apparatus 107-L may also include a control apparatus as a control apparatus 900-L although not illustrated.

Light L7-R emitted from the point light source array 1-R via the liquid crystal tunable filter 92-R passes through the collimator lens 2-R to be parallel light, is reflected by the half mirror 3-R (at a spot W7-R), passes through the quarter-wave plate 30-1-R, and is incident on the first digital mirror device 57-1-R. On the other hand, light L70-R emitted from the point light source array 1-R via the liquid crystal tunable filter 92-R passes through the collimator lens 2-R to be parallel light, is reflected by the half mirror 3-R (at a spot W70-R), passes through the quarter-wave plate 30-1-R, and is incident on the first digital mirror device 57-1-R.

Furthermore, the light L7-R emitted from the point light source array 1-R via the liquid crystal tunable filter 92-R passes through the collimator lens 2-R to be parallel light, is transmitted through the half mirror 3-R (the spot W7-R), passes through the quarter-wave plate 30-2-R, and is incident on the second digital mirror device 57-2-R. On the other hand, the light L70-R emitted from the point light source array 1-R via the liquid crystal tunable filter 92-R passes through the collimator lens 2-R to be parallel light, is transmitted through the half mirror 3-R (the spot W70-R), passes through the quarter-wave plate 30-2-R, and is incident on the second digital mirror device 57-2-R.

The light L7-R incident on the first digital mirror device 57-1-R is emitted from the first digital mirror device 57-1-R as the first image light L7A-R, passes through the quarter-wave plate 30-1-R, is transmitted through the half mirror 3-R (a transmission spot is a spot different from the spot W7-R), and is incident on a right eye 500-R (a pupil 500-1-R). On the other hand, the light L70-R incident on the first digital mirror device 57-1-R is emitted from the first digital mirror device 57-1-R as the first image light L70A-R, passes through the quarter-wave plate 30-1-R, is transmitted through the half mirror 3-R (a transmission spot is a spot different from the spot W70-R), and is incident on the right eye 500-R (pupil 500-1-R). Then, the first image light L7A-R and the first image light L70A-R generate a viewpoint S71-R in the pupil 500-1-R.

Furthermore, the light L7-R incident on the second digital mirror device 57-2-R is emitted from the second digital mirror device 57-2-R as the second image light L7B-R, passes through the quarter-wave plate 30-2-R, is reflected by the half mirror 3-R (a reflection spot is a spot different from the spot W7-R), and is incident on the right eye 500-R (pupil 500-1-R). On the other hand, the light L70-R incident on the second digital mirror device 57-2-R is emitted from the second digital mirror device 57-2-R as the second image light L70B-R, passes through the quarter-wave plate 30-2-R, is reflected by the half mirror 3-R (a reflection spot is a spot different from the spot W70-R), and is incident on the right eye 500-R (pupil 500-1-R). Then, the second image light L7B-R and the second image light L70B-R generate a viewpoint S72-R in the pupil 500-1-R.

As described above, the image display apparatus 107-R can simultaneously generate the viewpoint S71-R and the viewpoint S72-R which are two viewpoints.

As described above, the contents described for the image display apparatus of the fourth embodiment (Example 4 of the image display apparatus) according to the present technology can be applied to the image display apparatuses of the first to third embodiments according to the present technology described above and the image display apparatuses of the fifth to seventh embodiments according to the present technology as described later as long as there is no particular technical contradiction.

6. Fifth Embodiment (Example 5 of Image Display Apparatus)

The image display apparatus of the fifth embodiment (Example 5 of the image display apparatus) according to the present technology includes a light source, at least two image forming apparatuses, a quarter-wave plate, a beam splitter, a lens, and an eyepiece for each of eyes of a user. In the image display apparatus of the fifth embodiment according to the present technology, out of the at least two image forming apparatuses, a first image forming apparatus is provided in a predetermined angular direction with respect to an optical axis of the lens, and a second image forming apparatus is provided in a direction substantially perpendicular to the optical axis of the lens. Furthermore, in the image display apparatus of the fifth embodiment according to the present technology, light emitted from the light source is incident on the first image forming apparatus and the second image forming apparatus via the lens, the beam splitter, and the quarter-wave plate in this order, and first image light emitted from the first image forming apparatus and second image light emitted from the second image forming apparatus are incident on each of the eyes of the user via the quarter-wave plate, the beam splitter, and the eyepiece in this order.

Moreover, in the image display apparatus of the fifth embodiment according to the present technology, each of the first image forming apparatus and the second image forming apparatus includes a digital mirror device, the light source is a point light source array, and a filter wheel is disposed between the point light source array and the lens.

With respect to the optical axis of the lens, the first image forming apparatus is provided in the predetermined angular direction as described above, and may be provided for example, at any angle of more than 0 degrees to less than 90 degrees.

Examples of the beam splitter include a half mirror and the like. Examples of the lens include a collimator lens.

Hereinafter, the image display apparatus of the fifth embodiment (Example 5 of the image display apparatus) according to the present technology will be described with reference to FIG. 8.

Figure 8:
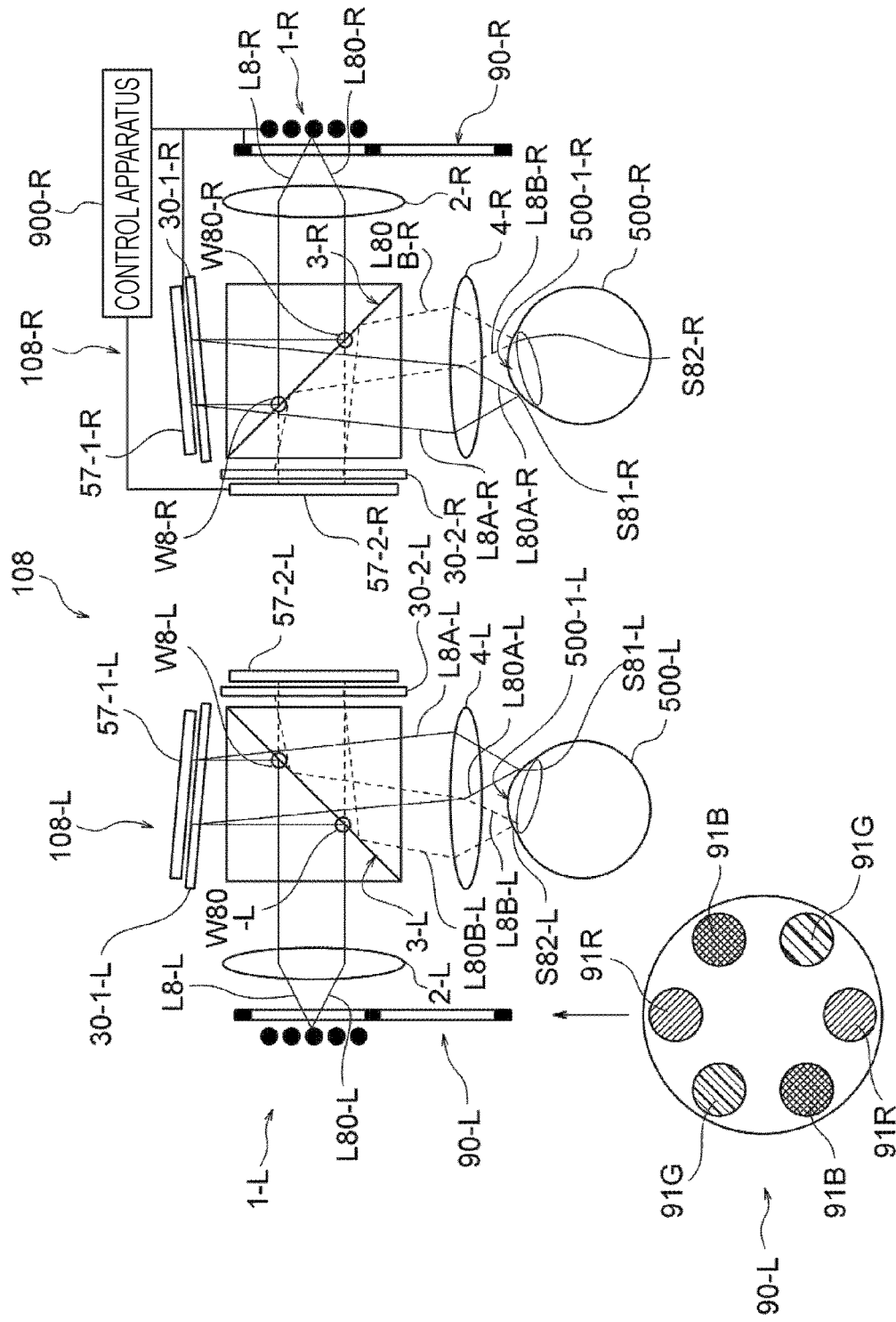
FIG. 8 is a diagram illustrating a configuration example of an image display apparatus according to a fifth embodiment to which the present technology is applied.

FIG. 8 illustrates an image display apparatus 108. The image display apparatus 108 includes an image display apparatus 108-L for a left eye and an image display apparatus 108-R for a right eye.

The image display apparatus 108-L includes a point light source array 1-L, two digital mirror devices 57-1-L and 57-2-L, two quarter-wave plates 30-1-L and 30-2-L, a half mirror 3-L, a collimator lens 2-L, and an eyepiece 4-L. In the image display apparatus 108-L, a filter wheel 90-L is disposed between the point light source array 1-L and the collimator lens 2-L.

Out of the two digital mirror devices 57-1-L and 57-2-L, the first digital mirror device 57-1-L is provided in a predetermined angular direction with respect to an optical axis (axis in the left-right direction in FIG. 8) of the collimator lens 2-L. In FIG. 8, the predetermined angle is a clockwise angle (negative angle) with respect to the optical axis of the collimator lens 2-L, which is any angle of more than 0 degrees to less than 90 degrees. The second digital mirror device 57-2-L is provided in a direction substantially perpendicular to the optical axis (axis in the left-right direction in FIG. 8) of collimator lens 2-L.

Meanwhile, the first digital mirror device 57-1-L may be provided in the direction substantially parallel to the optical axis (the axis in the left-right direction in FIG. 8) of the collimator lens 2-L, and the second digital mirror device 57-2-L may be provided in the predetermined angular direction with respect to the optical axis (the axis in the left-right direction in FIG. 8) of the collimator lens 2-L.

Light L8-L emitted from the point light source array 1-L via the filter wheel 90-L passes through the collimator lens 2-L to be parallel light, is reflected by the half mirror 3-L (at a spot W8-L), passes through the quarter-wave plate 30-1-L, and is incident on the first digital mirror device 57-1-L. On the other hand, light L80-L emitted from the point light source array 1-L via the filter wheel 90-L passes through the collimator lens 2-L to be parallel light, is reflected by the half mirror 3-L (at a spot W80-L), passes through the quarter-wave plate 30-1-L, and is incident on the first digital mirror device 57-1-L.

Furthermore, the light L8-L emitted from the point light source array 1-L via the filter wheel 90-L passes through the collimator lens 2-L to be parallel light, is transmitted through the half mirror 3-L (the spot W8-L), passes through the quarter-wave plate 30-2-L, and is incident on the second digital mirror device 57-2-L. On the other hand, the light L80-L emitted from the point light source array 1-L via the filter wheel 90-L passes through the collimator lens 2-L to be parallel light, is transmitted through the half mirror 3-L (the spot W80-L), passes through the quarter-wave plate 30-2-L, and is incident on the second digital mirror device 57-2-L.

The light L8-L incident on the first digital mirror device 57-1-L is emitted from the first digital mirror device 57-1-L as first image light L8A-L, passes through the quarter-wave plate 30-1-L, is transmitted through the half mirror 3-L (a transmission spot is a spot different from the spot W8-L), and is incident on a left eye 500-L (a pupil 500-1-L). On the other hand, the light L80-L incident on the first digital mirror device 57-1-L is emitted from the first digital mirror device 57-1-L as first image light L80A-L, passes through the quarter-wave plate 30-1-L, is transmitted through the half mirror 3-L (a transmission spot is a spot different from the spot W80-L), and is incident on the left eye 500-L (pupil

500-1-L). Then, the first image light L8A-L and the first image light L80A-L generate a viewpoint S81-L in the pupil 500-1-L.

Furthermore, the light L8-L incident on the second digital mirror device 57-2-L is emitted from the second digital mirror device 57-2-L as second image light L8B-L, passes through the quarter-wave plate 30-2-L, is reflected by the half mirror 3-L (a reflection spot is a spot different from the spot W8-L), and is incident on the left eye 500-L (pupil 500-1-L). On the other hand, the light L80-L incident on the second digital mirror device 57-2-L is emitted from the second digital mirror device 57-2-L as second image light L80B-L, passes through the quarter-wave plate 30-2-L, is reflected by the half mirror 3-L (a reflection spot is a spot different from the spot W80-L), and is incident on the left eye 500-L (pupil 500-1-L). Then, the second image light L8B-L and the second image light L80B-L generate a viewpoint S82-L in the pupil 500-1-L.

As described above, the image display apparatus 108-L can simultaneously generate the viewpoint S81-L and the viewpoint S82-L which are two viewpoints.

The image display apparatus 108-R includes a point light source array 1-R, two digital mirror devices 57-1-R and 57-2-R, two quarter-wave plates 30-1-R and 30-2-R, a half mirror 3-R, a collimator lens 2-R, and an eyepiece 4-R. Note that a filter wheel 90-R may be disposed between the point light source array 1-R and the collimator lens 2-R in the image display apparatus 108-R although not illustrated.

Out of the two digital mirror devices 57-1-R and 57-2-R, the first digital mirror device 57-1-R is provided in a predetermined angular direction with respect to an optical axis (axis in the left-right direction in FIG. 8) of the collimator lens 2-R. In FIG. 8, the predetermined angle is a counterclockwise angle (positive angle) with respect to the optical axis of the collimator lens 2-R, which is any angle of more than 0 degrees to less than 90 degrees. The second digital mirror device 57-2-R is provided in a direction substantially perpendicular to the optical axis (axis in the left-right direction in FIG. 8) of collimator lens 2-R.

Meanwhile, the first digital mirror device 57-1-R may be provided in the direction substantially parallel to the optical axis (the axis in the left-right direction in FIG. 8) of the collimator lens 2-R, and the second digital mirror device 57-2-R may be provided in the predetermined angular direction with respect to the optical axis (the axis in the left-right direction in FIG. 8) of the collimator lens 2-R.

The image display apparatus 108-R further includes a control apparatus 900-R. The control apparatus 900-R is connected to each of the point light source array 1-R, the filter wheel 90-R, the first digital mirror device 57-1-R, and the second digital mirror device 57-2-R. The control apparatus 900-R can control a viewpoint generated by synchronizing a position of a point light source of the point light source array 1-R, a color of at least one of a red (R) filter, a green (G) filter, or a blue (B) filter constituting the filter wheel 90-R, and first image light L8A-R and first image light L80A-R emitted from the first digital mirror device 57-1-R and second image light L8B-R and second image light L80B-R emitted from the second digital mirror device 57-2-R. Note that the image display apparatus 108-L may also include a control apparatus as a control apparatus 900-L although not illustrated.

Light L8-R emitted from the point light source array 1-R via the filter wheel 90-R passes through the collimator lens 2-R to be parallel light, is reflected by the half mirror 3-R (at a spot W8-R), passes through the quarter-wave plate 30-1-R, and is incident on the first digital mirror device 57-1-R. On the other hand, light L80-R emitted from the point light source array 1-R via the filter wheel 90-R passes through the collimator lens 2-R to be parallel light, is reflected by the half mirror 3-R (at a spot W80-R), passes through the quarter-wave plate 30-1-R, and is incident on the first digital mirror device 57-1-R.

Furthermore, the light L8-R emitted from the point light source array 1-R via the filter wheel 90-R passes through the collimator lens 2-R to be parallel light, is transmitted through the half mirror 3-R (the spot W8-R), passes through the quarter-wave plate 30-2-R, and is incident on the second digital mirror device 57-2-R. On the other hand, the light L80-R emitted from the point light source array 1-R via the filter wheel 90-R passes through the collimator lens 2-R to be parallel light, is transmitted through the half mirror 3-R (the spot W80-R), passes through the quarter-wave plate 30-2-R, and is incident on the second digital mirror device 57-2-R.

The light L8-R incident on the first digital mirror device 57-1-R is emitted from the first digital mirror device 57-1-R as the first image light L8A-R, passes through the quarter-wave plate 30-1-R, is transmitted through the half mirror 3-R (a transmission spot is a spot different from the spot W8-R), and is incident on a right eye 500-R (a pupil 500-1-R). On the other hand, the light L80-R incident on the first digital mirror device 57-1-R is emitted from the first digital mirror device 57-1-R as the first image light L80A-R, passes through the quarter-wave plate 30-1-R, is transmitted through the half mirror 3-R (a transmission spot is a spot different from the spot W80-R), and is incident on the right eye 500-R (pupil 500-1-R). Then, the first image light L8A-R and the first image light L80A-R generate a viewpoint S81-R in the pupil 500-1-R.

Furthermore, the light L8-R incident on the second digital mirror device 57-2-R is emitted from the second digital mirror device 57-2-R as the second image light L8B-R, passes through the quarter-wave plate 30-2-R, is reflected by the half mirror 3-R (a reflection spot is a spot different from the spot W8-R), and is incident on the right eye 500-R (pupil 500-1-R). On the other hand, the light L80-R incident on the second digital mirror device 57-2-R is emitted from the second digital mirror device 57-2-R as the second image light L80B-R, passes through the quarter-wave plate 30-2-R, is reflected by the half mirror 3-R (a reflection spot is a spot different from the spot W80-R), and is incident on the right eye 500-R (pupil 500-1-R). Then, the second image light L8B-R and the second image light L80B-R generate a viewpoint S82-R in the pupil 500-1-R.

As described above, the image display apparatus 108-R can simultaneously generate the viewpoint S81-R and the viewpoint S82-R which are two viewpoints.

As described above, the contents described for the image display apparatus of the fifth embodiment (Example 5 of the image display apparatus) according to the present technology can be applied to the image display apparatuses of the first to fourth embodiments according to the present technology described above and the image display apparatuses of the sixth and seventh embodiments according to the present technology as described later as long as there is no particular technical contradiction.

7. Sixth Embodiment (Example 6 of Image Display Apparatus)

The image display apparatus of the sixth embodiment (Example 6 of the image display apparatus) according to the present technology includes a light source, at least two image forming apparatuses, a quarter-wave plate, a beam splitter, a lens, and an eyepiece for each of eyes of a user. In the image display apparatus of the sixth embodiment according to the present technology, out of the at least two image forming apparatuses, a first image forming apparatus is provided in a predetermined angular direction with respect to an optical axis of the lens, and a second image forming apparatus is provided in a direction substantially perpendicular to the optical axis of the lens. Furthermore, in the image display apparatus of the sixth embodiment according to the present technology, light emitted from the light source is incident on the first image forming apparatus and the second image forming apparatus via the lens, the beam splitter, and the quarter-wave plate in this order, and first image light emitted from the first image forming apparatus and second image light emitted from the second image forming apparatus are incident on each of the eyes of the user via the quarter-wave plate, the beam splitter, and the eyepiece in this order.

Moreover, in the image display apparatus of the sixth embodiment according to the present technology, each of the first image forming apparatus and the second image forming apparatus includes a digital mirror device, and the light source is a polychromatic point light source array.

With respect to the optical axis of the lens, the first image forming apparatus is provided in the predetermined angular direction as described above, and may be provided for example, at any angle of more than 0 degrees to less than 90 degrees.

Examples of the beam splitter include a half mirror and the like. Examples of the lens include a collimator lens.

Hereinafter, the image display apparatus of the sixth embodiment (Example 6 of the image display apparatus) according to the present technology will be described with reference to FIG. 9.

Figure 9:
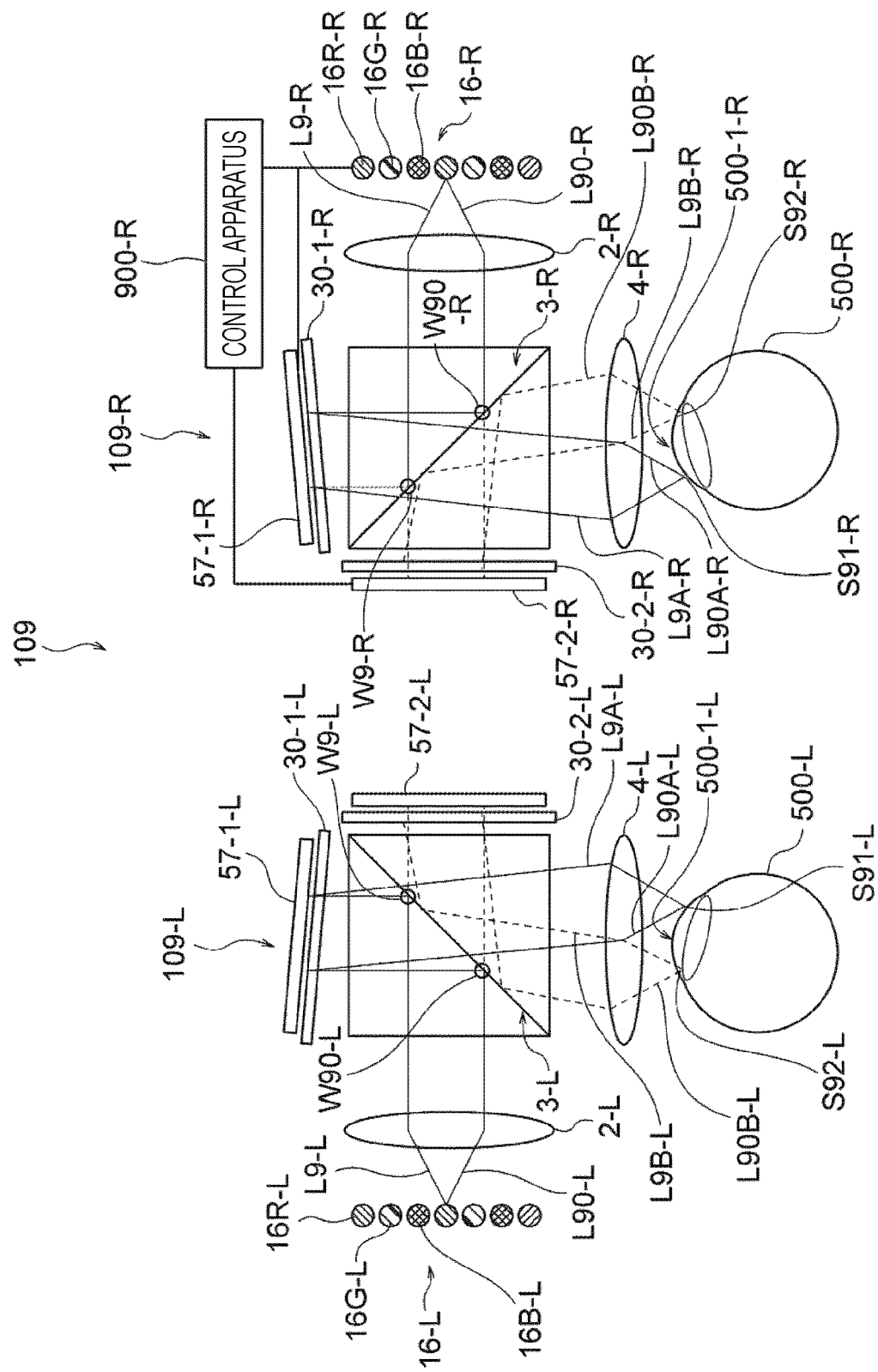
FIG. 9 is a diagram illustrating a configuration example of a line-of-sight detection apparatus according to a sixth embodiment to which the present technology is applied.

FIG. 9 illustrates an image display apparatus 109. The image display apparatus 109 includes an image display apparatus 109-L for the left eye and an image display apparatus 109-R for the right eye.

The image display apparatus 109-L includes a polychromatic point light source array 16-L, two digital mirror devices 57-1-L and 57-2-L, two quarter-wave plates 30-1-L and 30-2-L, a half mirror 3-L, a collimator lens 2-L, and an eyepiece 4-L.

Out of the two digital mirror devices 57-1-L and 57-2-L, the first digital mirror device 57-1-L is provided in a predetermined angular direction with respect to an optical axis (axis in the left-right direction in FIG. 9) of the collimator lens 2-L. In FIG. 9, the predetermined angle is a clockwise angle (negative angle) with respect to the optical axis of the collimator lens 2-L, which is any angle of more than 0 degrees to less than 90 degrees. The second digital mirror device 57-2-L is provided in a direction substantially perpendicular to the optical axis (axis in the left-right direction in FIG. 9) of collimator lens 2-L.

Meanwhile, the first digital mirror device 57-1-L may be provided in the direction substantially parallel to the optical axis (the axis in the left-right direction in FIG. 9) of the collimator lens 2-L, and the second digital mirror device 57-2-L may be provided in the predetermined angular direction with respect to the optical axis (the axis in the left-right direction in FIG. 9) of the collimator lens 2-L.

Light L9-L emitted from the polychromatic point light source array 16-L passes through the collimator lens 2-L to be parallel light, is reflected by the half mirror 3-L (at a spot W9-L), passes through the quarter-wave plate 30-1-L, and is incident on the first digital mirror device 57-1-L. On the other hand, light L90-L emitted from the polychromatic point light source array 16-L passes through the collimator lens 2-L to be parallel light, is reflected by the half mirror 3-L (at a spot W90-L), passes through the quarter-wave plate 30-1-L, and is incident on the first digital mirror device 57-1-L.

Furthermore, the light L9-L emitted from the polychromatic point light source array 16-L passes through the collimator lens 2-L to be parallel light, is transmitted through the half mirror 3-L (the spot W9-L), passes through the quarter-wave plate 30-2-L, and is incident on the second digital mirror device 57-2-L. On the other hand, the light L90-L emitted from the polychromatic point light source array 16-L passes through the collimator lens 2-L to be parallel light, is transmitted through the half mirror 3-L (the spot W90-L), passes through the quarter-wave plate 30-2-L, and is incident on the second digital mirror device 57-2-L.

The light L9-L incident on the first digital mirror device 57-1-L is emitted from the first digital mirror device 57-1-L as first image light L9A-L, passes through the quarter-wave plate 30-1-L, is transmitted through the half mirror 3-L (a transmission spot is a spot different from the spot W9-L), and is incident on a left eye 500-L (a pupil 500-1-L). On the other hand, the light L90-L incident on the first digital mirror device 57-1-L is emitted from the first digital mirror device 57-1-L as first image light L90A-L, passes through the quarter-wave plate 30-1-L, is transmitted through the half mirror 3-L (a transmission spot is a spot different from the spot W90-L), and is incident on the left eye 500-L (pupil 500-1-L). Then, the first image light L9A-L and the first image light L90A-L generate a viewpoint S91-L in the pupil 500-1-L.

Furthermore, the light L9-L incident on the second digital mirror device 57-2-L is emitted from the second digital mirror device 57-2-L as second image light L9B-L, passes through the quarter-wave plate 30-2-L, is reflected by the half mirror 3-L (a reflection spot is a spot different from the spot W9-L), and is incident on the left eye 500-L (pupil 500-1-L). On the other hand, the light L90-L incident on the second digital mirror device 57-2-L is emitted from the second digital mirror device 57-2-L as second image light L90B-L, passes through the quarter-wave plate 30-2-L, is reflected by the half mirror 3-L (a reflection spot is a spot different from the spot W90-L), and is incident on the left eye 500-L (pupil 500-1-L). Then, the second image light L9B-L and the second image light L90B-L generate a viewpoint S92-L in the pupil 500-1-L.

As described above, the image display apparatus 109-L can simultaneously generate the viewpoint S91-L and the viewpoint S92-L which are two viewpoints.

The image display apparatus 109-R includes a polychromatic point light source array 16-R, two digital mirror devices 57-1-R and 57-2-R, two quarter-wave plates 30-1-R and 30-2-R, a half mirror 3-R, a collimator lens 2-R, and an eyepiece 4-R.

Out of the two digital mirror devices 57-1-R and 57-2-R, the first digital mirror device 57-1-R is provided in a predetermined angular direction with respect to an optical axis (axis in the left-right direction in FIG. 9) of the collimator lens 2-R. In FIG. 9, the predetermined angle is a counterclockwise angle (positive angle) with respect to the optical axis of the collimator lens 2-R, which is any angle of more than 0 degrees to less than 90 degrees. The second digital mirror device 57-2-R is provided in a direction substantially perpendicular to the optical axis (axis in the left-right direction in FIG. 9) of collimator lens 2-R.

Meanwhile, the first digital mirror device 57-1-R may be provided in the direction substantially parallel to the optical axis (the axis in the left-right direction in FIG. 9) of the collimator lens 2-R, and the second digital mirror device 57-2-R may be provided in the predetermined angular direction with respect to the optical axis (the axis in the left-right direction in FIG. 9) of the collimator lens 2-R.

The image display apparatus 109-R may further include a control apparatus 900-R. The control apparatus 900-R is connected to each of the polychromatic point light source 16-R, the first digital mirror device 57-1-R, and the second digital mirror device 57-2-R. The control apparatus 900-R can control a viewpoint to be generated by synchronizing a position and a color of at least one point light source of a red (R) point light source 16R-R, a green (G) point light source 16G-R, or a blue (B) point light source 16B-R constituting the polychromatic point light source 16-R with the first image light L9A-L and first image light L90A-R emitted from the first digital mirror device 57-1-R and second image light L9B-R and second image light L90B-R emitted from the second digital mirror device 57-2-R. Note that the image display apparatus 106-L may also include a control apparatus as a control apparatus 900-L although not illustrated.

The light L9-R emitted from the polychromatic point light source array 16-R passes through the collimator lens 2-R to be parallel light, is reflected by the half mirror 3-R (at a spot W9-R), passes through the quarter-wave plate 30-1-R, and is incident on the first digital mirror device 57-1-R. On the other hand, the light L90-R emitted from the polychromatic point light source array 16-R passes through the collimator lens 2-R to be parallel light, is reflected by the half mirror 3-R (at a spot W90-R), passes through the quarter-wave plate 30-1-R, and is incident on the first digital mirror device 57-1-R.

Furthermore, the light L9-R emitted from the polychromatic point light source array 16-R passes through the collimator lens 2-R to be parallel light, is transmitted through the half mirror 3-R (the spot W9-R), passes through the quarter-wave plate 30-2-R, and is incident on the second digital mirror device 57-2-R. On the other hand, the light L90-R emitted from the polychromatic point light source array 16-R passes through the collimator lens 2-R to be parallel light, is transmitted through the half mirror 3-R (the spot W90-R), passes through the quarter-wave plate 30-2-R, and is incident on the second digital mirror device 57-2-R.

The light L9-R incident on the first digital mirror device 57-1-R is emitted from the first digital mirror device 57-1-R as the first image light L9A-R, passes through the quarter-wave plate 30-1-R, is transmitted through the half mirror 3-R (a transmission spot is a spot different from the spot W9-R), and is incident on a right eye 500-R (a pupil 500-1-R). On the other hand, the light L90-R incident on the first digital mirror device 57-1-R is emitted from the first digital mirror device 57-1-R as the first image light L90A-R, passes through the quarter-wave plate 30-1-R, is transmitted through the half mirror 3-R (a transmission spot is a spot different from the spot W90-R), and is incident on the right eye 500-R (pupil 500-1-R). Then, the first image light L9A-R and the first image light L90A-R generate a viewpoint S91-R in the pupil 500-1-R.

Furthermore, the light L9-R incident on the second digital mirror device 57-2-R is emitted from the second digital mirror device 57-2-R as the second image light L9B-R, passes through the quarter-wave plate 30-2-R, is reflected by the half mirror 3-R (a reflection spot is a spot different from the spot W9-R), and is incident on the right eye 500-R (pupil 500-1-R). On the other hand, the light L90-R incident on the second digital mirror device 57-2-R is emitted from the second digital mirror device 57-2-R as the second image light L90B-R, passes through the quarter-wave plate 30-2-R, is reflected by the half mirror 3-R (a reflection spot is a spot different from the spot W90-R), and is incident on the right eye 500-R (pupil 500-1-R). Then, the second image light L9B-R and the second image light L90B-R generate a viewpoint S92-R in the pupil 500-1-R.

As described above, the image display apparatus 109-R can simultaneously generate the viewpoint S91-R and the viewpoint S92-R which are two viewpoints.

As described above, the contents described for the image display apparatus of the sixth embodiment (Example 6 of the image display apparatus) according to the present technology can be applied to the image display apparatuses of the first to fifth embodiments according to the present technology described above and the image display apparatus of the seventh embodiment according to the present technology as described later as long as there is no particular technical contradiction.

8. Seventh Embodiment (Example 7 of Image Display Apparatus)

The image display apparatus of the seventh embodiment (7 of the image display apparatus) according to the present technology includes a light source, at least two image forming apparatuses, at least two beam splitters, at least two mirrors, a lens, and an eyepiece for each of eyes of a user. In the image display apparatus according to the seventh embodiment of the present technology, out of the at least two image forming apparatuses, a first image forming apparatus is provided in a direction substantially perpendicular to an optical axis of the lens, and a second image forming apparatus is provided in a direction substantially parallel to the optical axis of the lens.

Furthermore, in the image display apparatus according to the seventh embodiment of the present technology, light emitted from the light source is incident on the first image forming apparatus and the second image forming apparatus via the lens and a first beam splitter out of the at least two beam splitters in this order, first image light emitted from the first image forming apparatus is incident on each of the eyes of the user via a second beam splitter out of the at least two beam splitters and the eyepiece in this order, second image light emitted from the second image forming apparatus is incident on each of the eyes of the user via a first mirror and a second mirror of the at least two mirrors, the second beam splitter out of the at least two beam splitters, and the eyepiece in this order.

Moreover, in the image display apparatus according to the seventh embodiment of the present technology, each of the first image forming apparatus and the second image forming apparatus includes a transmissive spatial light modulator, the light source is a point light source array, and a liquid crystal tunable filter is disposed between the point light source array and the lens.

Examples of the beam splitter include a half mirror and the like. Examples of the lens include a collimator lens.

Each of the first mirror and the second mirror may be provided in a predetermined angular direction with respect to the optical axis of the lens. For example, the first mirror may be provided at any angle of more than 0 degrees to less than 90 degrees with respect to the optical axis of the lens, and the second mirror may be provided at any angle of more than 90 degrees to less than 180 degrees with respect to the optical axis of the lens.

Hereinafter, the image display apparatus of the seventh embodiment (Example 7 of the image display apparatus) according to the present technology will be described with reference to FIG. 10.

Figure 10:
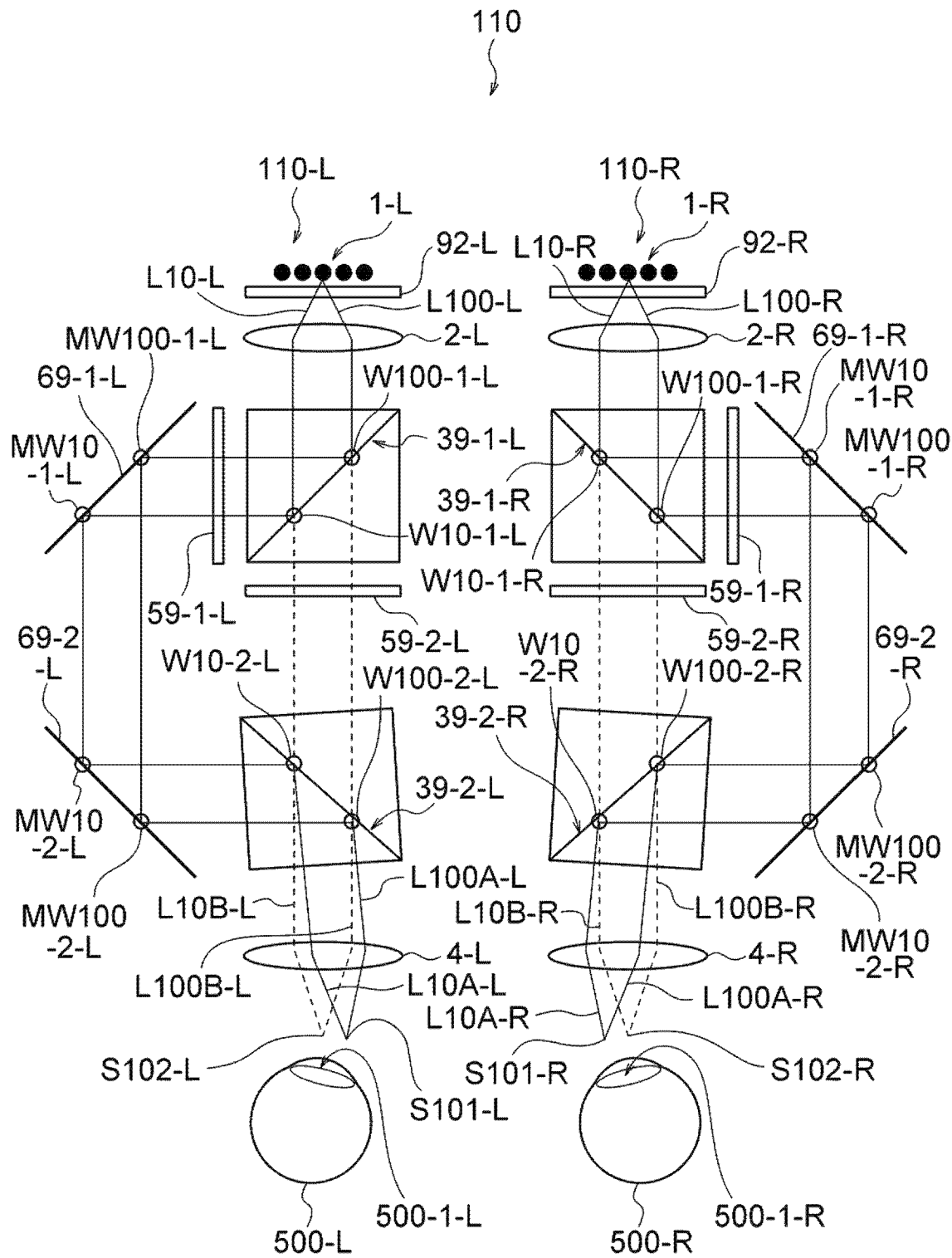
FIG. 10 is a diagram illustrating a configuration example of a line-of-sight detection apparatus according to a seventh embodiment to which the present technology is applied.

FIG. 10 illustrates an image display apparatus 110. The image display apparatus 110 includes an image display apparatus 110-L for a left eye and an image display apparatus 110-R for a right eye.

The image display apparatus 110-L includes a point light source array 1-L, two transmissive spatial light modulators 59-1-L and 59-2-L, two beam splitters 39-1-L and 39-2-L, two mirrors 69-1-L and 69-2-L, a collimator lens 2-L, and an eyepiece 4-L. In the image display apparatus 110-L, a liquid crystal tunable filter 92-L is disposed between the point light source array 1-L and the collimator lens 2-L.

Out of the two transmissive spatial light modulators 59-1-L and 59-2-L, the first transmissive spatial light modulator 59-1-L is provided in a direction substantially perpendicular to an optical axis (axis in the up-down direction in FIG. 10) of the collimator lens 2-L, and the second transmissive spatial light modulator 59-2-L is provided in a direction substantially perpendicular to the optical axis (axis in the up-down direction in FIG. 10) of the collimator lens 2-L.

Light L10-L emitted from the point light source array 1-L via the liquid crystal tunable filter 92-L passes through the collimator lens 2-L to be parallel light, is reflected by the beam splitter 39-1-L (at a spot W10-1-L), and is incident on the first transmissive spatial light modulator 59-1-L. On the other hand, light L100-L emitted from the point light source array 1-L via the liquid crystal tunable filter 92-L passes through the collimator lens 2-L to be parallel light, is reflected by the beam splitter 39-1-L (at a spot W100-1-L), and is incident on the first transmissive spatial light modulator 59-1-L.

Furthermore, the light L10-L emitted from the point light source array 1-L via the liquid crystal tunable filter 92-L passes through the collimator lens 2-L to be parallel light, is transmitted through the beam splitter 39-1-L (the spot W10-1-L), and is incident on the second transmissive spatial light modulator 59-2-L. On the other hand, the light L100-L emitted from the point light source array 1-L via the liquid crystal tunable filter 92-L passes through the collimator lens 2-L to be parallel light, is transmitted through the beam splitter 39-1-L (the spot W100-1-L), and is incident on the first transmissive spatial light modulator 59-2-L.

The light L10-L incident on the first transmissive spatial light modulator 59-1-L is emitted from the first transmissive spatial light modulator 5-1-L as first image light L10A-L, reflected by the first mirror 69-1-L (at a spot MW10-1-L), further reflected by the second mirror 69-2-L (at a spot MW10-2-L), reflected by the beam splitter 39-2-L (at a spot W10-2-L), and incident on a left eye 500-L (a pupil 500-1-L).

On the other hand, the light L100-L incident on the first transmissive spatial light modulator 59-1-L is emitted from the first transmissive spatial light modulator 59-1-L as first image light L100A-L, reflected by the first mirror 69-1-L (at a spot MW100-1-L), further reflected by the second mirror 69-2-L (at a spot MW100-2-L), reflected by the beam splitter 39-2-L (at a spot W100-2-L), and incident on the left eye 500-L (pupil 500-1-L).

Then, the first image light L10A-L and the first image light L100A-L generate a viewpoint S101-L in the pupil 500-1-L.

Furthermore, the light L10-L incident on the second transmissive spatial light modulator 59-2-L is emitted from the second transmissive spatial light modulator 59-2-L as second image light L10B-L, transmitted through the beam splitter 39-2-L (the spot W10-2-L), and incident on the left eye 500-L (pupil 500-1-L).

On the other hand, the light L100-L incident on the second transmissive spatial light modulator 59-2-L is emitted from the second transmissive spatial light modulator 59-2-L as second image light L100B-L, transmitted through the beam splitter 39-2-L (the spot W100-2-L), and incident on the left eye 500-L (pupil 500-1-L).

Then, the second image light L10B-L and the second image light L100B-L generate a viewpoint S102-L in the pupil 500-1-L.

As described above, the image display apparatus 110-L can simultaneously generate the viewpoint S101-L and the viewpoint S102-L which are two viewpoints.

The image display apparatus 110-R includes a point light source array 1-R, two transmissive spatial light modulators 59-1-R and 59-2-R, two beam splitters 39-1-R and 39-2-R, two mirrors 69-1-R and 69-2-R, a collimator lens 2-R, and an eyepiece 4-R. In the image display apparatus 110-R, a liquid crystal tunable filter 92-R is disposed between the point light source array 1-R and the collimator lens 2-R.

Out of the two transmissive spatial light modulators 59-1-R and 59-2-R, the first transmissive spatial light modulator 59-1-R is provided in a direction substantially perpendicular to the optical axis (axis in the up-down direction in FIG. 10) of the collimator lens 2-L, and the second transmissive spatial light modulator 59-2-R is provided in a direction substantially perpendicular to the optical axis (axis in the up-down direction in FIG. 10) of the collimator lens 2-R.

Light L10-R emitted from the point light source array 1-R via the liquid crystal tunable filter 92-R passes through the collimator lens 2-R to be parallel light, is reflected by the beam splitter 39-1-R (at a spot W10-1-R), and is incident on the first transmissive spatial light modulator 59-1-R. On the other hand, light L100-R emitted from the point light source array 1-R via the liquid crystal tunable filter 92-R passes through the collimator lens 2-R to be parallel light, is reflected by the beam splitter 39-1-R (at a spot W100-1-R), and is incident on the first transmissive spatial light modulator 59-1-R.

Furthermore, the light L10-R emitted from the point light source array 1-R via the liquid crystal tunable filter 92-R passes through the collimator lens 2-R to be parallel light, is transmitted through the beam splitter 39-1-R (the spot W10-1-R), and is incident on the second transmissive spatial light modulator 59-2-R. On the other hand, the light L100-R emitted from the point light source array 1-R via the liquid crystal tunable filter 92-R passes through the collimator lens 2-R to be parallel light, is transmitted through the beam splitter 39-1-R (the spot W100-1-R), and is incident on the first transmissive spatial light modulator 59-2-R.

The light L10-R incident on the first transmissive spatial light modulator 59-1-R is emitted from the first transmissive spatial light modulator 5-1-R as first image light L10A-R, reflected by the first mirror 69-1-R (at a spot MW10-1-R), further reflected by the second mirror 69-2-R (at a spot MW10-2-R), reflected by the beam splitter 39-2-R (at a spot W10-2-R), and incident on a right eye 500-R (a pupil 500-1-R).

On the other hand, the light L100-R incident on the first transmissive spatial light modulator 59-1-R is emitted from the first transmissive spatial light modulator 59-1-R as first image light L100A-R, reflected by the first mirror 69-1-R (at a spot MW100-1-R), further reflected by the second mirror

69-2-R (at a spot MW100-2-R), reflected by the beam splitter 39-2-R (at a spot W100-2-R), and incident on the right eye 500-R (pupil 500-1-R).

Then, the first image light L10A-R and the first image light L100A-R generate a viewpoint S101-R in the pupil 500-1-R.

Furthermore, the light L10-R incident on the second transmissive spatial light modulator 59-2-R is emitted from the second transmissive spatial light modulator 59-2-R as second image light L10B-R, transmitted through the beam splitter 39-2-R (the spot W10-2-R), and incident on the right eye 500-R (pupil 500-1-R).

On the other hand, the light L100-R incident on the second transmissive spatial light modulator 59-2-R is emitted from the second transmissive spatial light modulator 59-2-R as second image light L100B-R, transmitted through the beam splitter 39-2-R (the spot W100-2-R), and incident on the right eye 500-R (pupil 500-1-R).

Then, the second image light L10B-R and the second image light L100B-R generate a viewpoint S102-R in the pupil 500-1-R.

As described above, the contents described for the image display apparatus of the seventh embodiment (Example 7 of the image display apparatus) according to the present technology can be applied to the above-described image display apparatuses of the first to sixth embodiments according to the present technology as described later as long as there is no particular technical contradiction.

9. Eighth Embodiment (Example 1 of Display Apparatus)

A display apparatus of an eighth embodiment (Example 1 of the display apparatus) according to the present technology is a display apparatus including a frame mounted on a head of a user and an image display apparatus attached to the frame, the image display apparatus being the image display apparatus of at least one embodiment of the image display apparatuses of the first to seventh embodiments according to the present technology. Examples of the display apparatus of the eighth embodiment (Example 1 of the display apparatus) according to the present technology include an eyewear display, a head-mounted display (HMD), and the like.

The display apparatus of the eighth embodiment according to the present technology may be mounted on the head of the user, for example, have a glasses-like shape, and be configured to project image light (video light) to each of eyes.

Note that embodiments according to the present technology are not limited to the respective embodiments described above, and various modifications can be made within a scope not departing from a gist of the present technology.

Furthermore, effects described in the present specification are merely examples and are not limited, and there may be other effects.

Furthermore, the present technology can also have the following configurations.

[1]
An image display apparatus including a light source, at least two image forming apparatuses, a quarter-wave plate, a beam splitter, a lens, and an eyepiece for each of eyes of a user,
in which, out of the at least two image forming apparatuses,
a first image forming apparatus is provided in a predetermined angular direction with respect to an optical axis of the lens, and
a second image forming apparatus is provided in a direction substantially perpendicular to the optical axis of the lens,
light emitted from the light source is incident on the first image forming apparatus and the second image forming apparatus via the lens, the beam splitter, and the quarter-wave plate in this order, and
first image light emitted from the first image forming apparatus and second image light emitted from the second image forming apparatus are incident on each of the eyes of the user via the quarter-wave plate, the beam splitter, and the eyepiece in this order.

[2]
The image display apparatus according to [1], in which the beam splitter is a half mirror.

[3]
The image display apparatus according to [1] or [2], in which the light source is a point light source array, and
a wavelength variable filter is disposed between the point light source array and the lens.

[4]
The image display apparatus according to [1] or [2], in which the light source is a point light source array, and
a filter wheel is disposed between the point light source array and the lens.

[5]
The image display apparatus according to [1] or [2], in which the light source is a point light source array, and
a liquid crystal tunable filter is disposed between the point light source array and the lens.

[6]
The image display apparatus according to [1] or [2], in which the light source is a polychromatic point light source array.

[7]
The image display apparatus according to any one of [1] to [6], in which the lens is a collimator lens.

[8]
The image display apparatus according to any one of [1] to [7], in which each of the first image forming apparatus and the second image forming apparatus includes a spatial light modulator.

[9]
The image display apparatus according to [8], in which the spatial light modulator is a reflection type.

[10]
The image display apparatus according to any one of [1] to [7], in which each of the first image forming apparatus and the second image forming apparatus includes a liquid crystal on silicon (LCOS) device.

[11]
The image display apparatus according to any one of [1] to [7], in which each of the first image forming apparatus and the second image forming apparatus includes a ferroelectric liquid crystal on silicon (FLCOS) device.

[12]
The image display apparatus according to any one of [1] to [7], in which each of the first image forming apparatus and the second image forming apparatus includes a digital mirror device.

[13]
An image display apparatus including a light source, at least two image forming apparatuses, at least two beam splitters, at least two mirrors, a lens, and an eyepiece for each of eyes of a user,
in which, out of the at least two image forming apparatuses, a first image forming apparatus is provided in a direction substantially parallel to an optical axis of the lens, and a second image forming apparatus is provided in a direction substantially perpendicular to the optical axis of the lens, light emitted from the light source is incident on the first image forming apparatus and the second image forming apparatus via the lens and a first beam splitter out of the at least two beam splitters in this order, first image light emitted from the first image forming apparatus is incident on each of the eyes of the user via a first mirror and a second mirror of the at least two mirrors, a second beam splitter out of the at least two beam splitters, and the eyepiece in this order, and second image light emitted from the second image forming apparatus is incident on each of the eyes of the user via the second beam splitter out of the at least two beam splitters and the eyepiece in this order.

[14]

The image display apparatus according to [13], in which each of the first image forming apparatus and the second image forming apparatus includes a spatial light modulator.

[15]

The image display apparatus according to [14], in which the spatial light modulator is a transmission type.

[16]

The image display apparatus according to any one of to [15], in which each of the first mirror and the second mirror is provided in a predetermined angular direction with respect to the optical axis of the lens.

[17]

A display apparatus including:

a frame mounted on a head of a user; and an image display apparatus attached to the frame, in which the image display apparatus is the image display apparatus according to any one of [1] to [16].

REFERENCE SIGNS LIST

1(1-L, 1-R) Point light source array (light source)
2(2-L, 2-R) Collimator lens (lens)
3(3-L, 3-R) Half mirror (beam splitter)
4(4-L, 4-R) Eyepiece
5-1(5-1-L, 5-1-R) First spatial light modulator
5-2(5-2-L, 5-2-R) Second spatial light modulator
9(9-L, 9-R) Wavelength variable filter (light source)
16(16-L, 16-R) Polychromatic point light source array
30-1(30-1-L, 30-1-R) First quarter-wave plate
30-2(30-2-L, 30-2-R) Second quarter-wave plate
39-1(39-1-L, 39-1-R) First half mirror (first beam splitter)
39-2(39-2-L, 39-2-R) Second half mirror (second beam splitter)
55-1(55-1-L, 55-1-R) First ferroelectric liquid crystal on silicon (FLCOS) device
55-2(55-2-L, 55-2-R) Second ferroelectric liquid crystal on silicon (FLCOS) device
57-1(57-1-L, 57-1-R) First digital mirror device
57-2(57-2-L, 57-2-R) Second digital mirror device
69-1(69-1-L, 69-1-R) First mirror
69-2(69-2-L, 69-2-R) Second mirror
90(90-L, 90-R) Filter wheel
92(92-L, 92-R) Liquid crystal tunable filter
500(500-L, 500-R) Eyeball
500-1(500-1-L, 500-1-R) Pupil
103, 105, 106, 107, 108, 109, 110 Image display apparatus

The invention claimed is:

1. An image display apparatus, comprising:

a light source, at least two image forming apparatuses, a quarter-wave plate, a beam splitter, a lens, and an eyepiece for each of eyes of a user, wherein out of the at least two image forming apparatuses, a first image forming apparatus is provided in a predetermined angular direction with respect to an optical axis of the lens, and a second image forming apparatus is provided in a direction substantially perpendicular to the optical axis of the lens, light emitted from the light source is incident on the first image forming apparatus and the second image forming apparatus via the lens, the beam splitter, and the quarter-wave plate in order, and first image light emitted from the first image forming apparatus and second image light emitted from the second image forming apparatus are incident on each of the eyes of the user via the quarter-wave plate, the beam splitter, and the eyepiece in order.

2. The image display apparatus according to claim 1, wherein the beam splitter is a half mirror.

3. The image display apparatus according to claim 1, wherein the light source is a point light source array, and a wavelength variable filter is disposed between the point light source array and the lens.

4. The image display apparatus according to claim 1, wherein the light source is a point light source array, and a filter wheel is disposed between the point light source array and the lens.

5. The image display apparatus according to claim 1, wherein the light source is a point light source array, and a liquid crystal tunable filter is disposed between the point light source array and the lens.

6. The image display apparatus according to claim 1, wherein the light source is a polychromatic point light source array.

7. The image display apparatus according to claim 1, wherein the lens is a collimator lens.

8. The image display apparatus according to claim 1, wherein each of the first image forming apparatus and the second image forming apparatus includes a spatial light modulator.

9. The image display apparatus according to claim 8, wherein the spatial light modulator is a reflection type.

10. The image display apparatus according to claim 1, wherein each of the first image forming apparatus and the second image forming apparatus includes a liquid crystal on silicon (LCOS) device.

11. The image display apparatus according to claim 1, wherein each of the first image forming apparatus and the second image forming apparatus includes a ferroelectric liquid crystal on silicon (FLCOS) device.

12. The image display apparatus according to claim 1, wherein each of the first image forming apparatus and the second image forming apparatus includes a digital mirror device.

13. An image display apparatus, comprising:

a light source, at least two image forming apparatuses, at least two beam splitters, at least two mirrors, a lens, and an eyepiece for each of eyes of a user, wherein out of the at least two image forming apparatuses, a first image forming apparatus is provided in a direction substantially parallel to an optical axis of the lens, and a second image forming apparatus is provided in a direction substantially perpendicular to the optical axis of the lens, light emitted from the light source is incident on the first image forming apparatus and the second image forming apparatus via the lens and a first beam splitter out of the at least two beam splitters in order, first image light emitted from the first image forming apparatus is incident on each of the eyes of the user via a first mirror and a second mirror of the at least two mirrors, a second beam splitter out of the at least two beam splitters, and the eyepiece in order, and second image light emitted from the second image forming apparatus is incident on each of the eyes of the user via the second beam splitter out of the at least two beam splitters and the eyepiece in order.

14. The image display apparatus according to claim 13, wherein each of the first image forming apparatus and the second image forming apparatus includes a spatial light modulator.

15. The image display apparatus according to claim 14, wherein the spatial light modulator is a transmission type.

16. The image display apparatus according to claim 13, wherein each of the first mirror and the second mirror is provided in a predetermined angular direction with respect to the optical axis of the lens.

17. A display apparatus, comprising:

a frame mounted on a head of a user; and an image display apparatus attached to the frame, wherein the image display apparatus is the image display apparatus according to claim 1.

18. A display apparatus, comprising:

a frame mounted on a head of a user; and an image display apparatus attached to the frame, wherein the image display apparatus is the image display apparatus according to claim 13.

\* \* \* \* \*